United States Patent
Banks, III et al.

(10) Patent No.: US 10,138,851 B2
(45) Date of Patent: Nov. 27, 2018

(54) AUTOMOBILE AIR FILTRATION SYSTEM

(71) Applicants: Gale C. Banks, III, Azusa, CA (US);
Chris Otani, Azusa, CA (US)

(72) Inventors: Gale C. Banks, III, Azusa, CA (US);
Chris Otani, Azusa, CA (US)

(73) Assignee: Gale C. Banks, III, Azusa, CA (US)

(*) Notice: Subject to any disclaimer, the term of this patent is extended or adjusted under 35 U.S.C. 154(b) by 125 days.

(21) Appl. No.: 15/265,678

(22) Filed: Sep. 14, 2016

(65) Prior Publication Data

US 2017/0074218 A1  Mar. 16, 2017

Related U.S. Application Data

(60) Provisional application No. 62/219,482, filed on Sep. 16, 2015, provisional application No. 62/377,926, filed on Aug. 22, 2016.

(51) Int. Cl.
| | |
|---|---|
| *F02M 35/02* | (2006.01) |
| *B01D 46/00* | (2006.01) |
| *B01D 46/24* | (2006.01) |

(52) U.S. Cl.
CPC ..... *F02M 35/0204* (2013.01); *B01D 46/0005* (2013.01); *B01D 46/009* (2013.01); *B01D 46/2414* (2013.01); *B01D 2275/201* (2013.01); *B01D 2279/60* (2013.01)

(58) Field of Classification Search
CPC ........ B01D 46/10; B01D 46/00; B01D 50/00; B01D 53/34; F02M 35/024
USPC ................. 55/385.3, 498, DIG. 28, DIG. 30; 123/184.57, 198 E; 181/228, 229; 60/297, 299, 311; 285/407, 420
See application file for complete search history.

(56) References Cited

U.S. PATENT DOCUMENTS

| | | | |
|---|---|---|---|
| 4,523,937 A | 6/1985 | Brubaker | |
| 6,425,930 B1 * | 7/2002 | Wake | B01D 46/0095 |
| | | | 123/198 E |
| 7,524,349 B2 * | 4/2009 | Schrage | B01D 46/0004 |
| | | | 123/198 E |

(Continued)

OTHER PUBLICATIONS https://web.archive.org/web/20090821233502/http://www.knfilters.com/57s_airbox.htm, accessed Feb. 17, 2015, 2 pages.

(Continued)

*Primary Examiner* — Duane Smith
*Assistant Examiner* — Minh Chau T Pham
(74) *Attorney, Agent, or Firm* — Lewis Roca Rothgerber Christie LLP

(57) ABSTRACT

An automobile air filtration system including an air intake housing configured to house an air filter assembly. The air filter assembly includes filter media having a first end and a second end, and a base member including a locating member having a first width coupled to the second end. The air intake housing includes at least one sidewall defining an interior chamber, an inlet opening and an outlet opening defined in the sidewall, an outlet passageway defined by a portion of the sidewall extending to the outlet opening along an outlet axis, and a slip region having a second width defined in the portion of the sidewall defining the outlet passageway. When the air filter assembly is received in the interior chamber of the air intake housing, the locating member of the air filter assembly is received in the slip region of the air intake housing.

18 Claims, 13 Drawing Sheets

(56) References Cited

U.S. PATENT DOCUMENTS

| | | | |
|---|---|---|---|
| 7,931,725 B2 | 4/2011 | Wydeven et al. | |
| 8,083,822 B2 * | 12/2011 | Hoffman | F01N 3/2892 |
| | | | 123/184.57 |
| 8,092,563 B2 * | 1/2012 | Crandell | F01N 3/28 |
| | | | 123/184.57 |
| 8,097,055 B2 * | 1/2012 | Staley | F01N 13/08 |
| | | | 123/184.57 |
| 8,303,679 B2 | 11/2012 | Muenkel et al. | |
| 8,757,393 B2 | 6/2014 | Thienel | |
| 8,834,610 B2 * | 9/2014 | Lundgren | B01D 46/0046 |
| | | | 55/320 |
| 2011/0308212 A1 | 12/2011 | Ruhland et al. | |
| 2012/0324849 A1 | 12/2012 | Ackermann et al. | |
| 2014/0102060 A1 | 4/2014 | Kato et al. | |
| 2014/0165834 A1 | 6/2014 | Kaufmann et al. | |
| 2015/0013281 A1 | 1/2015 | Kaufmann et al. | |
| 2015/0020487 A1 | 1/2015 | Scott et al. | |

OTHER PUBLICATIONS http://www.grizzlycentral.com/forum/grizzly-tech-tips/15006-serious-660-air-filter-mod-part-2-a.html, accessed Feb. 17, 2015, 10 pages.
https://web.archive.org/web/20050304004116/http://www.bmpdesign.com/product-exec/product_id/4087, accessed Feb. 17, 2015, 1 page.

* cited by examiner

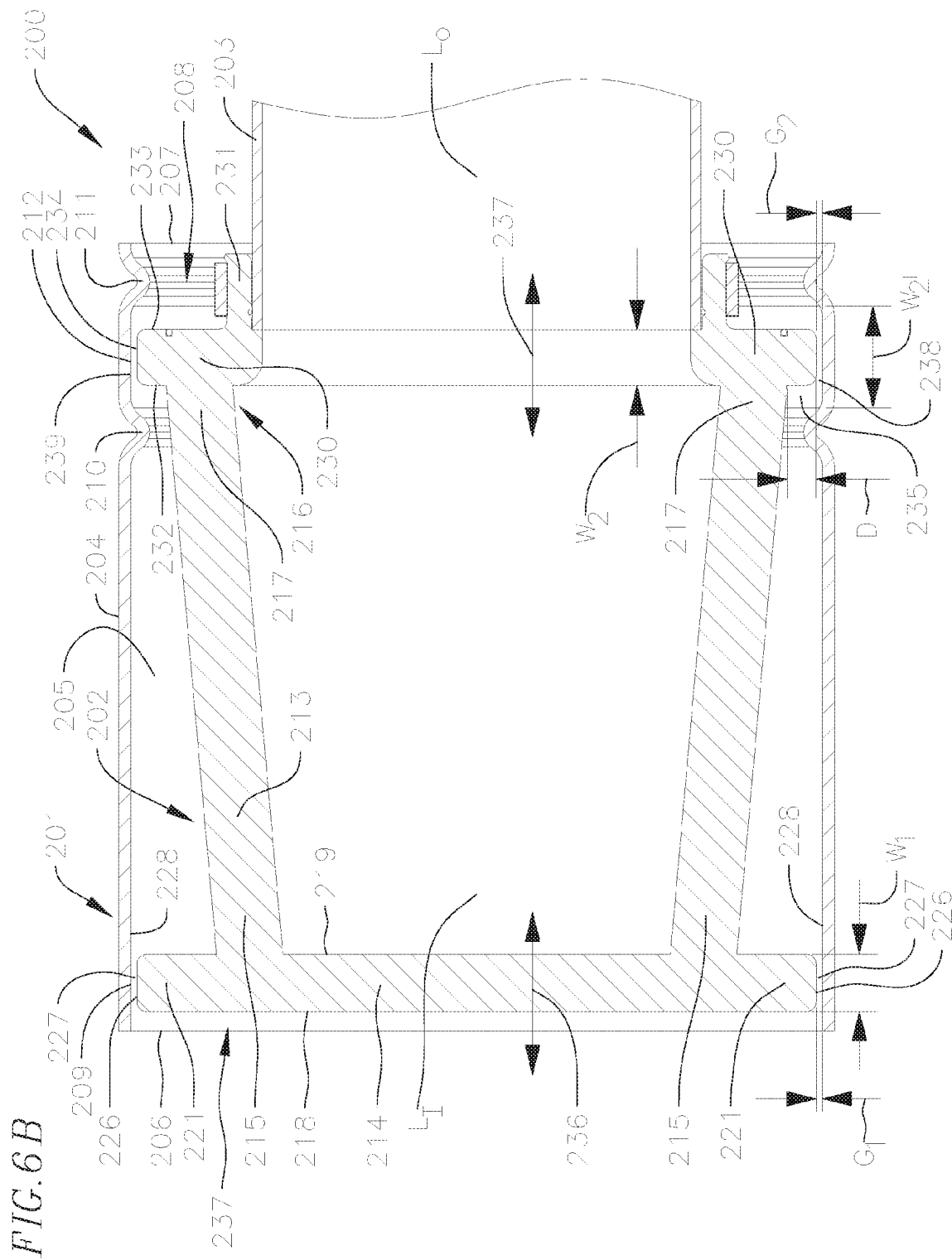

AUTOMOBILE AIR FILTRATION SYSTEM

CROSS-REFERENCE TO RELATED APPLICATIONS

The present application claims priority to and the benefit of U.S. Provisional Application No. 62/219,482 entitled "Automobile Air Filtration System," filed on Sep. 16, 2015 in the U.S. Patent and Trademark Office, and U.S. Provisional Application No. 62/377,926 entitled "Automobile Air Filtration System," filed on Aug. 22, 2016 in the U.S. Patent and Trademark Office, the entire contents of both of which are incorporated herein by reference.

FIELD

The present disclosure is directed generally to automobile air filtration systems.

BACKGROUND

Modern automobile air filtration systems commonly include an air intake housing, an air filter housed in the intake housing, and an intake hose coupled to the air filter configured to deliver air to the intake manifold of the engine. For instance, cold air intake systems are configured to improve the performance of the engine by delivering colder, and therefore relatively more dense, air to the intake manifold of the engine. In a conventional cold air intake system, the air filter and the intake hose are coupled to the engine of the vehicle and the air intake housing is typically coupled to a portion of the body of the vehicle located away from the engine (e.g., in a fender well), which separates or isolates the air filter from the warmer air surrounding the engine and allows the air filter to draw in cooler air.

During operation of the vehicle, the air filter may tend to move relative to the air intake housing because the air filter, the intake hose, and the air intake housing are coupled to different portions of the automobile and are therefore subject to different mechanical loads. For instance, engine vibrations may cause the air filter and the intake hose to move relative to the air intake housing. The movement of the air filter and the intake hose relative to the air intake housing may generate mechanical loading (e.g., stress and strain) on the air filter and/or the intake hose, which may tend to prematurely wear the air filter and the intake hose.

Accordingly, conventional air filtration systems may include one or more mechanisms for permitting the air filter to move relative to the air intake housing to minimize the generation of mechanical loading on the air filter, the air intake housing, and the intake hose due to the movement of the air filter and the intake hose relative to the air intake housing. In conventional automobile air filtrations systems, compliance may be achieved by bellows in the intake hose or with a hump in the intake hose. However, such conventional mechanisms in the intake hose for achieving compliance tend to restrict airflow through the air filtration system, which may limit engine performance. Alternatively, conventional automobile air filtration systems may be designed without compliance between the air filter and the air intake housing.

SUMMARY

The present disclosure is directed to various embodiments of an automobile air intake housing configured to house an air filter. In one embodiment, the automobile air intake housing includes at least one sidewall defining an interior chamber, an inlet opening defined in the at least one sidewall, an outlet opening defined in the at least one sidewall, an outlet passageway defined by a portion of the at least one sidewall and extending to the outlet opening along an outlet axis, and a slip region defined in the portion of the at least one sidewall defining the outlet passageway. The slip region is configured to accommodate a portion of the air filter when the air filter is housed in the interior chamber. The air intake housing may include an outer rib projecting from the portion of the at least one sidewall into the outlet passageway and located at a first end of the slip region. The air intake housing may also include an inner rib projecting from the portion of the at least one sidewall into the outlet passageway. The inner rib may be spaced apart from the outer rib and located at a second end of the slip region. The inner rib may be substantially parallel to the outer rib. The inner rib may have a first height and the outer rib may have a second height less than the first height. The inner rib and the outer rib may each extend radially inward toward the outlet axis. The slip region may have a width from approximately ⅛ inch to approximately 5 inches. The slip region may be substantially straight in cross-section and the slip region may be substantially parallel to the outlet axis. At least a portion of the slip region may be curved in cross-section. The outer rib and the inner rib may each have a semi-circular cross-sectional shape.

The air intake housing may also include an inlet passageway defined by a second portion of the at least one sidewall. The inlet passageway extends to the inlet opening along an inlet axis. The air intake housing may also include a second slip region defined in the second portion of the at least one sidewall defining the inlet passageway. The second slip region is configured to accommodate a second portion of the air filter when the air filter is housed in the interior chamber. The air intake housing may also include an outer rib projecting from the portion of the at least one sidewall into the outlet passageway and located at a first end of the slip region. The air intake housing may also include an inner rib. The inner rib may project from the portion of the at least one sidewall into the outlet passageway and may be located at a second end of the slip region. The inner rib may project from the second portion of the at least one sidewall into the inlet passageway and may be located at an end of the second slip region. The air intake housing may also include an air scoop defining a side inlet opening.

The present disclosure is also directed to various embodiments of an automobile air filtration system. In one embodiment, the automobile air filtration system includes an air filter assembly. The air filter assembly includes filter media having a first end and a second end, a base member coupled to the second end of the filter media and including a locating member having a first width, and an air intake housing configured to house the air filter assembly. The air intake housing includes at least one sidewall defining an interior chamber, an inlet opening defined in the at least one sidewall, an outlet opening defined in the at least one sidewall, an outlet passageway defined by a portion of the at least one sidewall and extending to the outlet opening along an outlet axis, and a slip region defined in the portion of the at least one sidewall defining the outlet passageway. The slip region has a second width. When the air filter assembly is received in the interior chamber of the air intake housing, the locating member of the air filter assembly is received in the slip region of the air intake housing. The air intake housing may include an inner rib projecting from the portion of the at least one sidewall into the outlet passageway and located at a first end of the slip region. The air intake housing may also include an outer rib projecting from the portion of the at least one sidewall into the outlet passageway. The outer rib may be spaced apart from the inner rib and located at a second end of the slip region. The inner rib may be substantially parallel to the outer rib. The second width of the slip region may be greater than the first width of the locating member of the air filter assembly such that the locating member of the air filter assembly is movably disposed in the slip region between the inner rib and the outer rib. The second width of the slip region may be substantially equal to the first width of the locating member of the air filter assembly such that the locating member of the air filter assembly is positively retained in the slip region between the inner rib and the outer rib. The inner rib may have a first height and the outer rib may have a second height less than the first height. The slip region may be substantially straight and the slip region may be substantially parallel to the outlet axis. At least a portion of the slip region may curved in cross-section and at least a portion of an interface surface of the locating member may be curved in cross-section.

When the air filter assembly is installed in the air intake housing, an interface surface of the locating member of the air filter assembly may be spaced apart by a gap from an inner surface of the slip region of the air intake housing. The gap may have a distance from approximately 0.01 inch to approximately 0.6 inch. The second end of the filter media may be larger than the first end of the filter media and the second end of the filter media may be recessed inward from an interface surface of the locating member of the air filter assembly. The air filter assembly may also include an end cap coupled to the first end of the filter media.

The air intake housing may also include an inlet passageway defined by a second portion of the at least one sidewall and extending to the inlet opening along an inlet axis, a second slip region defined in the second portion of the at least one sidewall defining the inlet passageway; and a second locating member coupled to the first end of the filter media. When the air filter assembly is received in the interior chamber of the air intake housing, the second locating member of the air filter assembly is received in the second slip region of the air intake housing. The second locating member may define a series of notches defining a series of airflow passageways permitting air to flow in through the inlet opening and past the second locating member. The air intake housing may also include an outer rib projecting from the portion of the at least one sidewall into the outlet passageway and located at a first end of the slip region. The air intake housing may also include an inner rib. The inner rib may project from the portion of the at least one sidewall into the outlet passageway and may be located at a second end of the slip region. The inner rib may project from the second portion of the at least one sidewall into the inlet passageway and may be located at an end of the second slip region.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 6A and 6B are a front view and a cross-sectional view, respectively, of an automotive air filtration system according to another embodiment of the present disclosure;

DETAILED DESCRIPTION

The present disclosure is directed to various embodiments of an automobile air filtration system having an air intake housing, an air filter configured to be housed in the air intake housing, and an intake conduit (e.g., a hose or a tube) coupled to the air filter that is configured to deliver air to the engine of the automobile. In one or more embodiments of the present disclosure, the air intake housing and the air filter are configured such that air filter is permitted to move relative to the air intake housing (i.e., mechanical compliance between the air filter and the air intake housing), such as, for instance, due to the movement of the engine to which the filter is coupled relative to the body of the vehicle to which the housing is coupled. The mechanical compliance between the air filter and the air intake housing is configured to protect the air filter, the intake conduit, and the air intake housing against premature wear and failure, which might otherwise occur due to the differential mechanical loading on the air filter and the air intake housing if there were no mechanical compliance between the air intake housing and the air filter. Additionally, the automobile air filtration system according to various embodiments of the present disclosure includes fewer components than conventional air intake systems.

Figure 1:
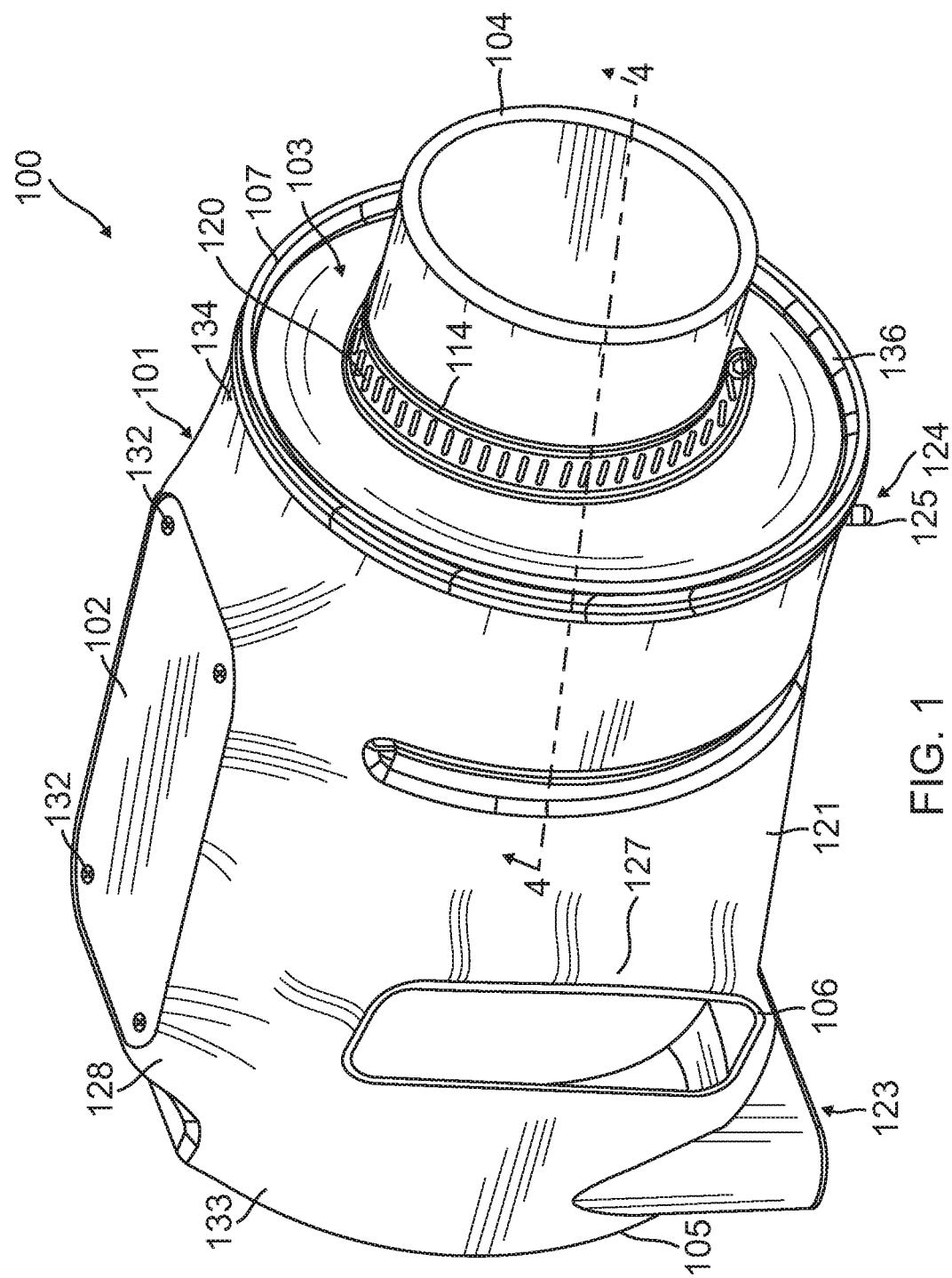
FIG. 1 is a perspective view of an automotive air filtration system including an air intake housing and an air filter assembly according to one embodiment of the present disclosure.

With reference now to FIG. 1, an automobile air filtration system 100 according to one embodiment of the present disclosure includes an air intake housing 101, a housing cover 102 configured to be detachably coupled to the air intake housing 101, an air filter assembly 103 configured to be at least partially housed in the air intake housing 101, and an intake conduit 104 (e.g., a flexible hose or a generally rigid tube) coupled to the air filter assembly 103. In one or more embodiments, the air intake housing 101 is configured to be coupled to a portion of a body of a vehicle, such as, for instance, a fender (e.g., inside a fender well) or a bumper of an automobile, and the intake conduit 104 is configured to be coupled to an intake manifold of the engine of the vehicle. Additionally, in the illustrated embodiment, the air intake housing 101 defines a front inlet opening 105, a side inlet opening 106, and an outlet opening 107. Although in the illustrated embodiment the air intake housing 101 defines a single side inlet opening 106, in one or more embodiments, the air intake housing 101 may define any other suitable number of side inlet openings 106, such as, for instance, two or more side inlet openings 106. Additionally, the one or more side inlet openings 106 may have any other suitable locations along the air intake housing 101 (e.g., the side inlet opening 106 may be an upper opening or a lower opening defined in the air intake housing 101). The air filter assembly 103 is configured to extend into the air intake housing 101 through the outlet opening 107. Air is configured to flow into the front and side inlet openings 105, 106 in the air intake housing 101, flow through the air filter assembly 103, and then flow out through the intake conduit 104 to the intake manifold on the engine. In one or more alternate embodiments, the air intake housing 101 may define any other suitable number of inlet openings, such as, for instance, a single inlet opening.

Figure 2A:
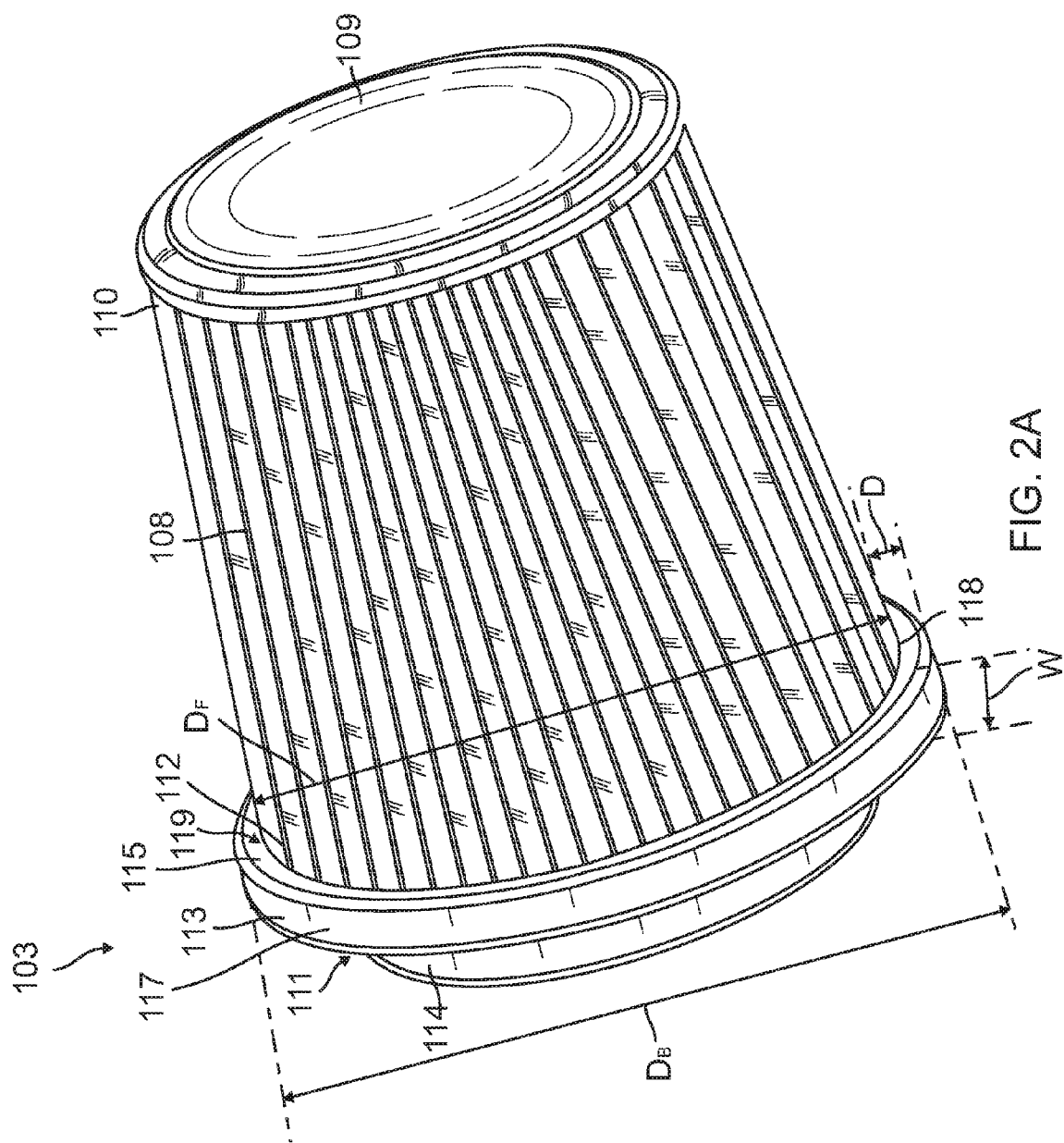
FIGS. 2A and 2B are perspective views of the embodiment of the air filter assembly illustrated in FIG. 1.
Figure 2B:
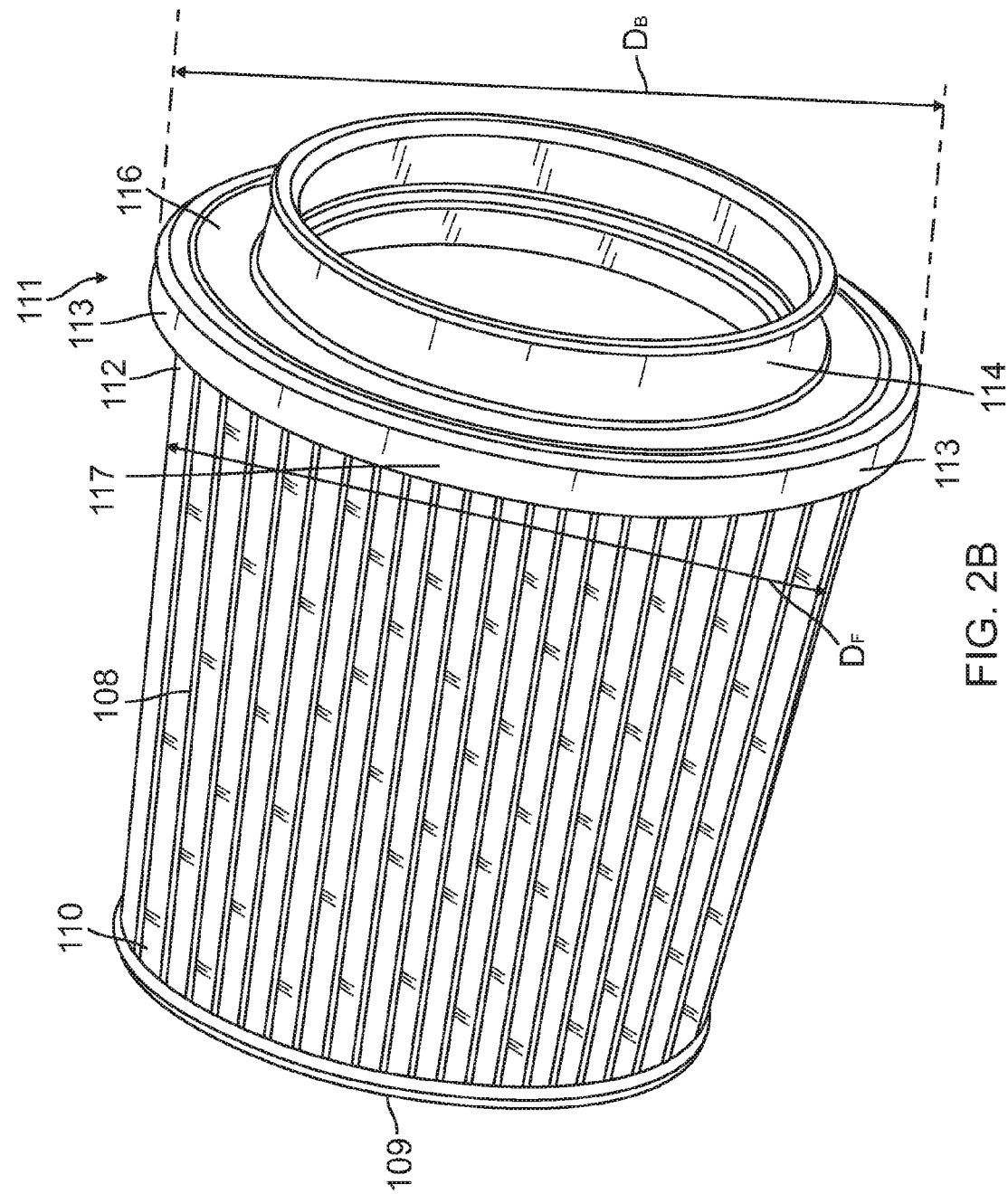

With reference now to the embodiment illustrated in FIGS. 2A and 2B, the air filter assembly 103 includes filter media 108, an end cap 109 coupled to a distal end 110 of the filter media 108, and a base member 111 coupled to a proximal end 112 of the filter media 108. In the illustrated embodiment, the proximal end 112 of the filter media 108 is larger than the distal end 110 of the filter media 108 (e.g., the proximal end 112 has a larger diameter than the distal end 110 of the filter media 108) such that the filter media 108 tapers between the larger proximal end 112 and the smaller distal end 110. Accordingly, in the illustrated embodiment, the filter media 108 of the air filter assembly 103 is frustoconical. In one or more alternate embodiments, the filter media 108 of the air filter assembly 103 may have any other suitable shape, such as, for instance, cylindrical. Additionally, in the illustrated embodiment the filter media 108 is pleated, although in one or more alternate embodiments, the filter media 108 may have any other suitable configuration (e.g., non-pleated). The filter media 108 may be made out of any suitably porous material configured to filter particulate matter from air flowing into the air intake housing 101, such as, for instance, natural fibers (e.g., cotton), a synthetic material (e.g., a non-woven synthetic material), or combinations thereof.

Still referring to the embodiment illustrated in FIGS. 2A and 2B, the base member 111 of the air filter assembly 103 includes a locating member 113 and a cuff (e.g., a conduit support flange or lip) 114 extending from the locating member 113. In the illustrated embodiment, the locating member 113 of the base member 111 includes an inner wall 115, an outer wall 116 opposite the inner wall 115, and an outer sidewall having one or more interface surfaces 117 extending between the inner wall 115 and the outer wall 116. In the illustrated embodiment, the locating member 113 of the base member 111 defines a groove 118 (e.g., an annular groove) extending outward from the inner wall 115. The groove 118 is configured to receive and support the larger proximal end 112 of the filter media 108 (e.g., the groove 118 is configured to retain the larger proximal end 112 of the filter media 108). The locating member 113 of the base member 111 may have any suitable width W defined from the inner wall 115 to the outer wall 116, such as, for instance, from approximately ¼ inch to approximately 1 inch. In one embodiment, the width W of the locating member 113 of the base member 111 is approximately ¾ inch. In one or more embodiments, the width W of the locating member 113 may be less than approximately ¼ inch or greater than approximately 1 inch. Although in the illustrated embodiment the locating member 113 of the base member 111 is a cylindrical or a substantially cylindrical member, in one or more embodiments the locating member 113 of the base member 111 of the air filter assembly 103 may have any other suitable shape, such as, for instance, any suitable prismatic shape or any other suitable non-prismatic shape. Additionally, although in the illustrated embodiment the one or more interface surfaces 117 of the locating member 113 are straight or substantially straight in cross-section (e.g., a cross-section taken by a plane extending through a longitudinal axis of the air filter assembly 103), the one or more interface surfaces 117 of the locating member 113 may have any other suitable shape (e.g., the one or more interface surfaces 117 of the locating member 113 may be curved or rounded in cross-section). As described in more detail below, the one or more interface surfaces 117 of the locating member 113 are configured to slidably and/or otherwise (e.g., rotatably) engage a portion of the air intake housing 101 to provide compliance between the air filter assembly 103 and the air intake housing 101.

Still referring to the embodiment illustrated in FIGS. 2A and 2B, the locating member 113 of the base member 111 is larger than the proximal end 112 of the filter media 108 such that the proximal end 112 of the filter media 108 is recessed inward from the one or more interface surfaces 117 of the locating member 113 of the base member 111 (e.g., an outer diameter $D_B$ of the locating member 113 of the base member 111 is larger than an outer diameter $D_F$ of the proximal end 112 of the filter media 108). The larger proximal end 112 of the filter media 108 may be recessed inward from the one or more interface surfaces 117 of the locating member 113 of the base member 111 by any suitable distance D, such as, for instance, from approximately ⅛ inch to approximately ⅝ inch. In one embodiment, the larger proximal end 112 of the filter media 108 is recessed inward from the one or more interface surfaces 117 of the locating member 113 of the base member 111 by approximately ⅜ inch. In one or more embodiments, the larger proximal end 112 of the filter media 108 may be recessed inward from the one or more interface surfaces 117 of the locating member 113 of the base member 111 by any other suitable value, such as, for instance, less than approximately ⅛ inch or greater than approximately ⅝ inch. Accordingly, in the illustrated embodiment, a recess 119 is defined between the locating member 113 of the base member 111 and the larger proximal end 112 of the filter media 108, the significance of which is described below.

With continued reference to the embodiment illustrated in FIGS. 2A and 2B, the cuff 114 of the air filter assembly 103 is cylindrical or substantially cylindrical (e.g., the cuff 114 is annular). In one or more embodiments, the cuff 114 may have any other suitable shape. Additionally, in the illustrated embodiment, the cuff 114 is recessed inward from the one or more interface surfaces 117 of the locating member 113. In one or more embodiments, an inner diameter of the cuff 114 is the same or substantially the same as an outer diameter of the intake conduit 104 (see FIG. 1). Accordingly, in one or more embodiments, the intake conduit 104 extends into the cuff 114 of the air filter assembly 103. Additionally, in the embodiment illustrated in FIG. 1, the intake conduit 104 is coupled to an inner surface of the cuff 114 of the air filter assembly 103 by a hose clamp 120. The size (e.g., diameter) of the cuff 114 may be selected depending, for instance, on the desired size of the intake conduit 104 configured to be coupled to the air filter assembly 103 and the desired airflow rate through the automobile air filtration system 100 to the engine.

Figure 3A:
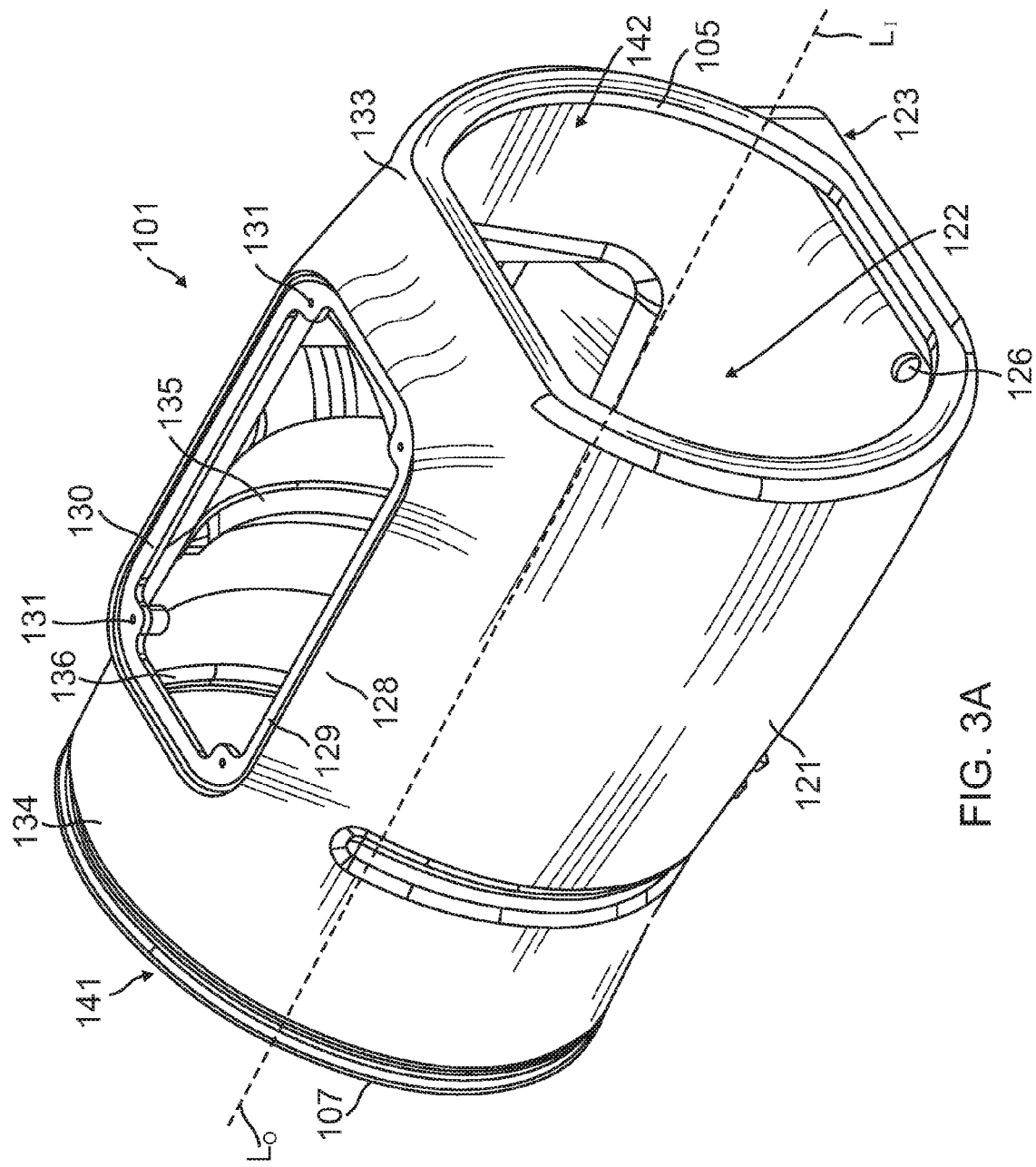
FIGS. 3A and 3B are perspective views of the embodiment of the air intake housing illustrated in FIG. 1.
Figure 3B:
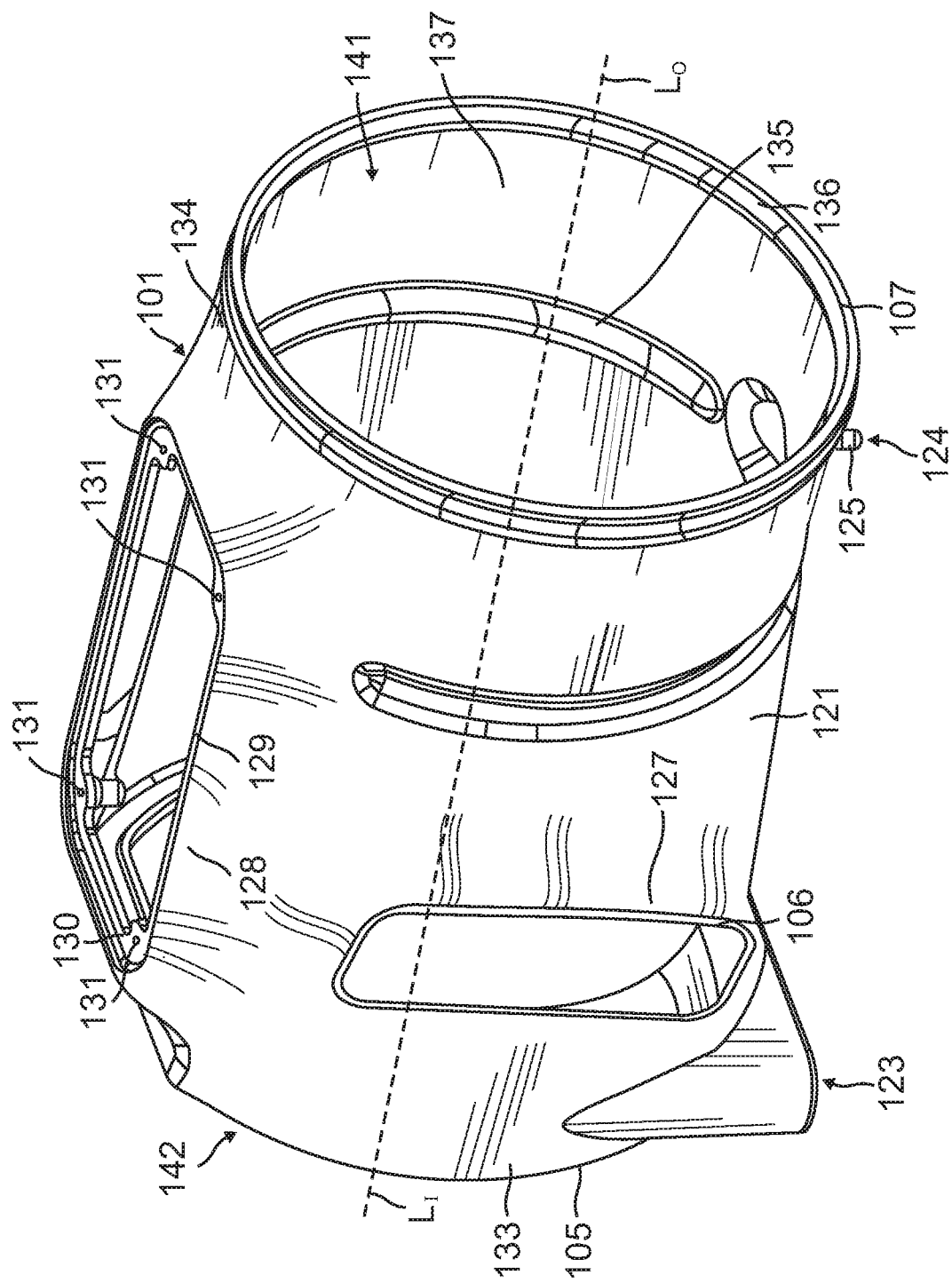

With reference now to the embodiment illustrated in FIGS. 3A and 3B, the air intake housing 101 includes at least one sidewall 121 defining an interior cavity 122 configured to house the air filter assembly 103. In the illustrated embodiment, the sidewall 121 is generally cylindrical. In one or more embodiments, the sidewall 121 may have any other suitable shape. Additionally, although in the illustrated embodiment the air intake housing 101 includes only a single sidewall 121, in one or more embodiments, the air intake housing 101 may have any other suitable number of sidewalls. For instance, in one or more embodiments, the air intake housing 101 may have four sidewalls arranged in a square prismatic shape. The one or more sidewalls 121 of the air intake housing 101 may be made out of any suitable material, such as, for instance, plastic (e.g., cross-linked polyethylene), carbon fiber reinforced plastic, metal, or combinations thereof.

Still referring to the embodiment illustrated in FIGS. 3A and 3B, the air intake housing 101 also includes a pair of standoffs 123, 124 extending outward from the sidewall 121. The standoffs 123, 124 are configured to facilitate coupling the air intake housing 101 to the body of the vehicle (e.g., the fender or the bumper of the vehicle). Additionally, in the illustrated embodiment, one of the standoffs 123 defines a pair of openings configured to receive fasteners coupling the air intake housing 101 to the body of the vehicle and other standoff 124 includes a peg 125 configured to extend into a grommet on the body of the vehicle. For instance, in one or more embodiments, the standoffs 123, 124 may be configured to be coupled to an original equipment manufacturer (OEM) mounting plate in the vehicle. In one or more alternate embodiments, the air intake housing 101 may have any other suitable number of standoffs and the standoffs 123, 124 may have any other suitable size, shape, configuration, and arrangement on the air intake housing 101 depending, for instance, on the size, shape, and configuration of the portion of the body of the vehicle to which the air intake housing 101 is intended to be coupled.

In the embodiment illustrated in FIGS. 3A and 3B, the air intake housing 101 defines a drain hole 126 in the sidewall 121. In the illustrated embodiment, the drain hole 126 is proximate one of the standoffs 123. In one or more embodiments, the drain hole 126 may be located in any other suitable position depending, for instance, on the orientation of the air intake housing 101 when it is coupled to the body of the vehicle. The drain hole 126 is configured to prevent the accumulation of liquid in the interior cavity 122 of the air intake housing 101, which might otherwise reduce the efficacy of the automobile air filtration system 100. Additionally, although in the illustrated embodiment the air intake housing 101 defines a single drain hole 126, in one or more embodiments, the air intake housing 101 may define any other suitable number of drain holes. The drain hole 126 may have any suitable size depending on the intended application of the automobile air filtration system 100, such as, for instance, approximately ½ inch diameter.

Additionally, in the illustrated embodiment, the air intake housing 101 includes an air scoop 127 extending outward from the sidewall 121. An outer end of the air scoop 127 defines the side inlet opening 106. In the illustrated embodiment, the side inlet opening 106 is canted (e.g., angled) toward the front inlet opening 105 (e.g., a portion of the air scoop 127 proximate the front inlet opening 105 is shorter than a portion of the air scoop 127 proximate the outlet opening 107 such that the side inlet opening 106 is angled toward the front inlet opening 105). In one or more alternate embodiments, the air scoop 127 may have any other suitable orientation depending, for instance, on the intended orientation of the automobile air filtration system 100 in the vehicle. Although in the illustrated embodiment the side inlet opening 106 is rectangular or substantially rectangular, in one or more embodiments, the side inlet opening 106 may have any other suitable shape, such as, for instance, oval or circular. Additionally, in one or more embodiments, the air intake housing 101 may have two or more air scoops 127 and two or more corresponding side inlet openings 106. In one or more embodiments, the air intake housing 101 may be provided without the air scoop 127.

In the embodiment illustrated in FIGS. 3A and 3B, the air intake housing 101 also includes a raised platform 128 extending outward from the sidewall 121 and an access port 129 defined in the raised platform 128. The access port 129 opens up into the interior cavity 122 of the air intake housing 101. Accordingly, the access port 129 is configured to facilitate access to the interior cavity 122 of the air intake housing 101, such as, for installation and/or maintenance of the automobile air filtration system 100. Additionally, in the illustrated embodiment, the raised platform 128 defines a recess 130 configured to accommodate the cover 102 (see FIG. 1) (i.e., the cover 102 is configured to be received in the recess 130). In the illustrated embodiment, the raised platform 128 also defines a series of openings 131 configured to receive fasteners 132 (see FIG. 1) extending through corresponding openings in the cover 102 to couple the cover 102 to the air intake housing 101. When the cover 102 is detachably coupled to the air intake housing 101, the cover 102 conceals the access port 129. Although in the illustrated embodiment the access port 129 and the cover 102 are rectangular, in one or more embodiments, the access port 129 and the cover 102 may have any other suitable shape, such as, for instance, circular.

With continued reference to the embodiment illustrated in FIGS. 3A and 3B, the air intake housing 101 defines an outlet passageway 141 extending to the outlet opening 107 along an outlet axis $L_O$. In the illustrated embodiment, the air intake housing 101 also defines an inlet passageway 142 extending to the front inlet opening 105 along an inlet axis $L_I$. In the illustrated embodiment, the front inlet opening 105 is located at a distal end 133 of the air intake housing 101 and the outlet opening 107 is located at a proximal end 134 of the air intake housing 101 opposite the distal end 133. Additionally, although in the illustrated embodiment the inlet axis $L_I$ and the outlet axis $L_O$ are coaxial such that the front inlet opening 105 and the inlet passageway 142 are aligned with the outlet opening 107 and the outlet passageway 141, in one or more alternate embodiments, the inlet axis $L_I$ and the outlet axis $L_O$ may not be coaxial such that the front inlet opening 105 and the inlet passageway 142 are not aligned with the outlet opening 107 and the outlet passageway 141.

Figure 4:
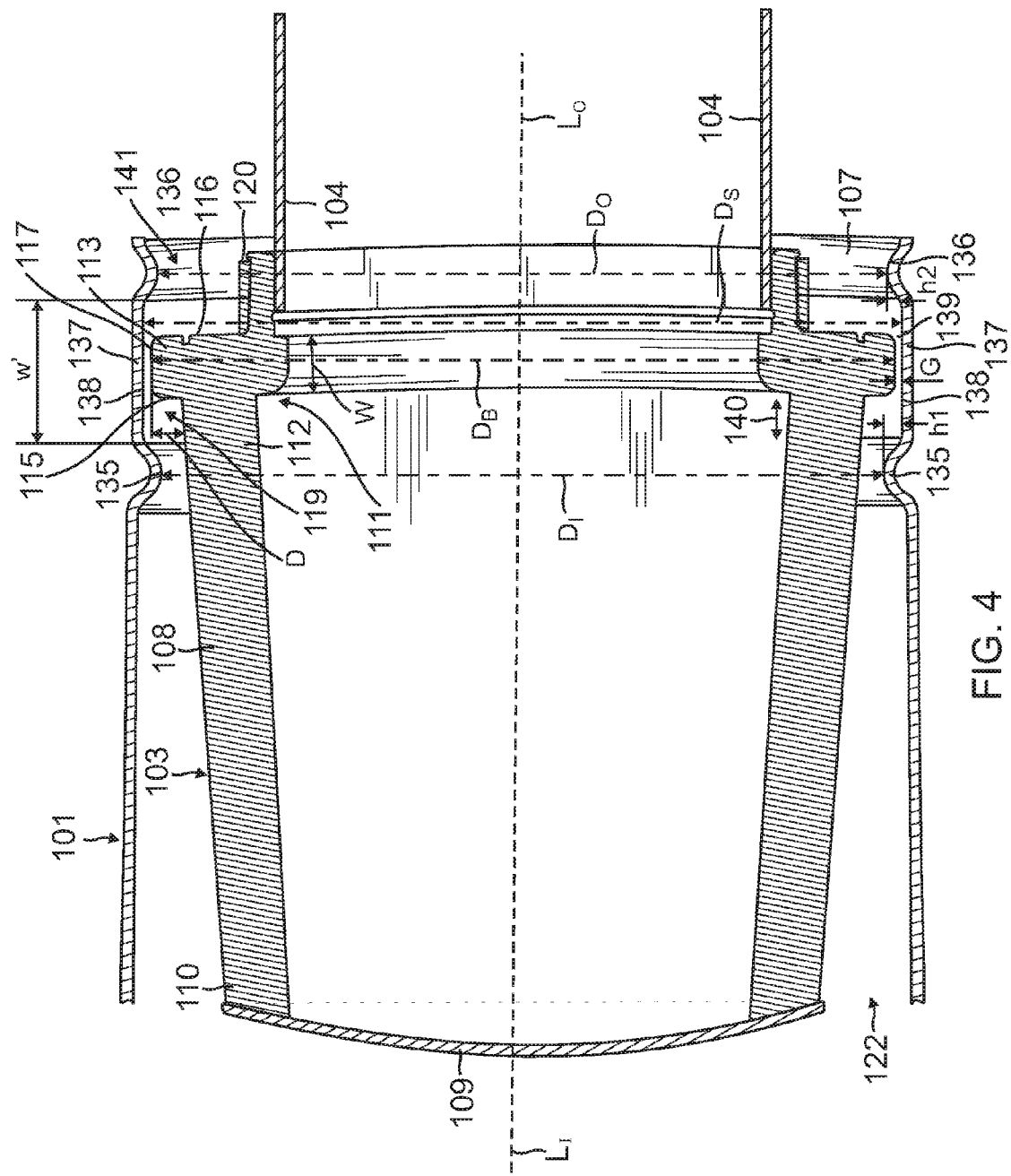
FIG. 4 is a cross-sectional view of the embodiment of the automotive air filtration system illustrated in FIG. 1.

Referring now to the embodiment illustrated in FIGS. 3A, 3B, and 4, the air intake housing 101 includes an inner lip or rib 135 extending into the outlet passageway 141 and an outer lip or rib 136 spaced apart from the inner rib 135 and extending into the outlet passageway 141. In the illustrated embodiment, the outer rib 136 is parallel or substantially parallel with the inner rib 135. Additionally, in the illustrated embodiment, the inner and outer ribs 135, 136 extend radially inward from the sidewall 121 toward the outlet axis $L_O$ (e.g., the inner and outer ribs 135, 136 extend in a direction perpendicular or substantially perpendicular to the outlet axis $L_O$ of the air intake housing 101). In one or more embodiments, the inner and outer ribs 135, 136 may extend in any other suitable direction (e.g., the inner and outer ribs 135, 136 may be canted relative to the outlet axis $L_O$ of the air intake housing 101). For instance, in one or more embodiments, the inner rib 135 and/or the outer rib 136 may be canted toward the outlet opening 107. In one or more embodiments, the inner rib 135 and/or the outer rib 136 may be canted toward the front inlet opening 105.

Still referring to the embodiment illustrated in FIGS. 3A, 3B, and 4, the inner rib 135 and the outer rib 136 each have a semi-circular cross-sectional shape in a plane extending through the outlet axis $L_O$ of the air intake housing 101, although in one or more embodiments, the inner and outer ribs 135, 136 may have any other suitable cross-sectional shape (e.g., any other suitable curvature or any suitable non-curved shape). In the illustrated embodiment, the inner rib 135 has a radius of approximately ¼ inch. In one or more embodiments, the inner rib 135 may have any other suitable radius, such as, for instance, from approximately 1/32 inch to approximately ¾ inch. In one or more embodiments, the inner rib 135 has a radius from approximately ⅛ inch to approximately ½ inch. Additionally, although in the illustrated embodiment the inner rib 135 has the same or substantially the same cross-sectional shape as the outer rib 136, in one or more embodiments, the cross-sectional shape of the inner rib 135 may be different than the cross-sectional shape of the outer rib 136. In the illustrated embodiment, the outer rib 136 has a radius of approximately ⅛ inch. In one or more embodiments, the outer rib 136 may have any other suitable radius, such as, for instance, from approximately 1/16 inch to approximately ¼ inch. Additionally, although in the illustrated embodiment the inner and outer ribs 135, 136 are integrally formed with the sidewall 121 of the air intake housing 101, in one or more alternate embodiments, the inner rib 135 and/or the outer rib 136 may be separately formed from the sidewall 121 of the air intake housing 101 and subsequently coupled to the sidewall 121 of the air intake housing 101 by any suitable manufacturing method, such as bonding, fastening, and/or adhering.

In the illustrated embodiment, the outer rib 136 extends continuously around the sidewall 121 of the air intake housing 101 (e.g., the outer rib 136 is a complete annular member extending 360 degrees around the outlet axis $L_O$ of the air intake housing 101) and the inner rib 135 extends discontinuously around the sidewall 121 of the air intake housing 101. In the illustrated embodiment, the inner rib 135 includes two rib segments each extending partially around the sidewall 121 of the air intake housing 101. In one or more alternate embodiments, the inner rib 135 may extend continuously around the sidewall 121 of the air intake housing 101 (e.g., the inner rib 135 may be a complete annular member extending 360 degrees around the outlet axis $L_O$ of the air intake housing 101). Additionally, in one or more embodiments, the outer rib 136 may extend discontinuously around the sidewall 121 of the air intake housing 101 (e.g., the outer rib 136 may include two or more discrete segments each extending partially around the sidewall 121 of the air intake housing 101).

Figure 5:
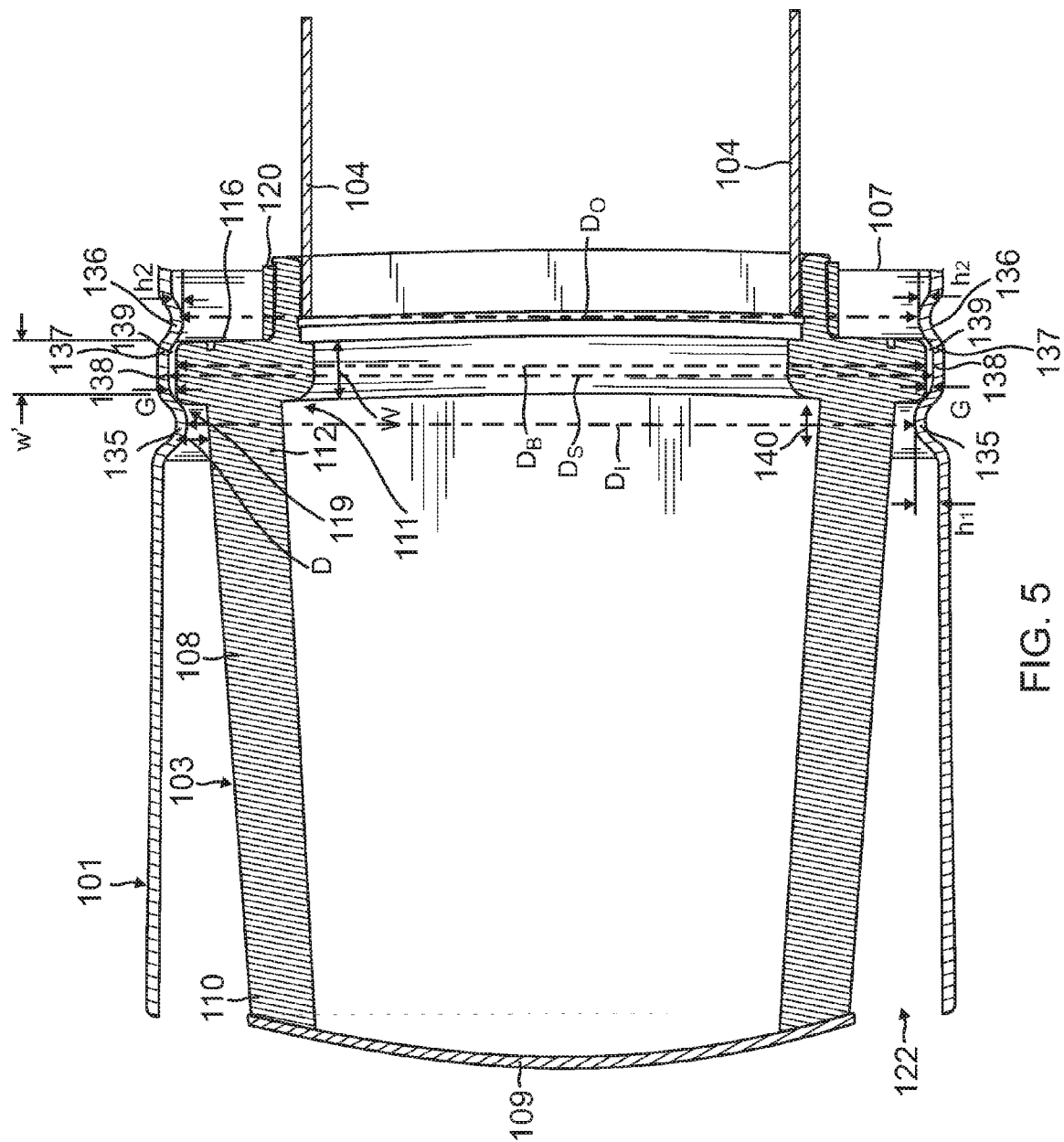
FIG. 5 is a cross-sectional view of an automotive air filtration system according to another embodiment of the present disclosure.

Additionally, in the embodiment illustrated in FIGS. 3A, 3B, and 4, the sidewall 121 of the air intake housing 101 includes a portion (a "slip region") 137 defined between the inner rib 135 and the outer rib 136. Although in the illustrated embodiment the slip region 137 has a straight or substantially straight cross-sectional shape in a plane extending through the outlet axis $L_O$ of the air intake housing 101, in one or more alternate embodiments, the slip region 137 may have any other suitable configuration. In one or more embodiments, the slip region 137 may be parallel or substantially parallel to the outlet axis $L_O$ of the air intake housing 101. In one or more embodiments, the slip region 137 may be curved. The slip region 137 of the air intake housing 101 may have any suitable width W' (e.g., the distance between an outer end of the inner rib 135 and an inner end of the outer rib 136), such as, for instance, from approximately ¼ inch to approximately 6 inches, depending for instance on the size, shape, and configuration of the air filter assembly 103 and/or the desired compliance between the air filter assembly 103 and the air intake housing 101, as described in more detail below. In one embodiment, the width W' of the slip region 137 is from approximately ½ inch to approximately 1 inch, such as, for instance, approximately ¾ inch. In another embodiment, the width W' of the slip region 137 is from approximately 3 inches to approximately 5 inches, such as, for instance, approximately 4 inches. In one or more embodiments, the width W' of the slip region 137 is from approximately ½ inch to approximately 5 inches. In the illustrated embodiment, the width W' of the slip region 137 of the air intake housing 101 is larger than the width W of the locating member 113 of the base member 111 of the air filter assembly 103, the significance of which is described below. In an alternate embodiment illustrated in FIG. 5, the width W' of the slip region 137 of the air intake housing 101 may be the same or substantially the same as the width W of the locating member 113 of the base member 111 of the air filter assembly 103. In one embodiment in which the width W' of the slip region 137 is the same or substantially the same as the width W of the locating member 113, the locating member 113 of the air filter assembly 103 is positively retained by the inner rib 135 and the outer rib 136 simultaneously engaging the inner and outer walls 115, 116, respectively, of the locating member 113 of the base member 111 of the air filter assembly 103. In one or more embodiments, the width W' of the slip region 137 of the air intake housing may be slightly smaller than the width W of the locating member 113 of the base member 111 of the air filter assembly 103.

With continued reference to the embodiment illustrated in FIG. 4, the inner rib 135 has a first height $h_1$ measured from an inner surface 138 of the slip region 137 and the outer rib 136 has a second height $h_2$ measured from the inner surface 138 of the slip region 137. In the illustrated embodiment, the first height $h_1$ of the inner rib 135 is greater than the second height $h_2$ of the outer rib 136 (e.g., the inner rib 135 extends further into the outlet passageway 141 than the outer rib 136). Additionally, in the illustrated embodiment, the second height $h_2$ of the outer rib 136 is selected such that there is a slight or minor interference fit between the locating member 113 of the air filter assembly 103 and the outer rib 136 (e.g., an inner diameter $D_O$ of the outer rib 136 is slightly smaller than the outer diameter $D_B$ of the locating member 113 of the air filter assembly 103). That is, in the illustrated embodiment, the outer rib 136 extends past the outer sidewall 117 of the locating member 113 and slightly overlaps a portion of the outer wall 116 of the locating member 113. Accordingly, the air filter assembly 103 may be installed in the air intake housing 103 by pressing the air filter assembly 103 into the outlet opening 107 and the outlet passageway 141 until the locating member 113 of the base member 111 of the air filter assembly 103 "snaps" inward past the outer rib 136. Additionally, the slight interference between the outer rib 136 and the locating member 113 of the air filter assembly 103 permits removing the air filter assembly 103 from the interior cavity 122 of the air intake housing 101 by pulling the air filter assembly 103 out through the outlet passageway 141 and the outlet opening 107 until the locating member 113 of the air filter assembly 103 snaps outward past the outer rib 136. Additionally, in the illustrated embodiment, the first height $h_1$ of the inner rib 135 is such that there is a major interference between the locating member 113 of the air filter assembly 103 and the inner rib 135 (e.g., an inner diameter $D_I$ of the inner rib 135 is larger than the outer diameter $D_B$ of the locating member 113 of the air filter assembly 103). That is, in the illustrated embodiment, the inner rib 135 extends past the outer sidewall 117 of the locating member 113 and overlaps a portion of the inner wall 115 of the locating member 113. Accordingly, the inner rib 135 is configured to prevent the locating member 113 of the air filter assembly 103 from passing inward past the inner rib 135 (e.g., as the air filter assembly 103 is slid inward, contact between the inner wall 115 of the locating member 113 of the air filter assembly 103 and the inner rib 135 is configured to prevent the locating member 113 of the air filter assembly 103 from passing inward past the inner rib 135). Therefore, in the illustrated embodiment, when the air filter assembly 103 is installed in the air intake housing 101, the locating member 113 of the air filter assembly 103 is retained in the slip region 137 of the air intake housing 101 between the inner rib 135 and the outer rib 136. In one or more alternate embodiments, the inner rib 135 and the outer rib 136 may have any other suitable heights $h_1$, $h_2$, respectively. For instance, in one or more embodiments, the inner rib 135 and the outer rib 136 may have the same or approximately the same height $h_1$, $h_2$.

Additionally, when the air filter assembly 103 is coupled to the air intake housing 101 such that the locating member 113 of the base member 111 of the air filter assembly 103 is retained between the inner rib 135 and the outer rib 136 of the air intake housing 101, the inner rib 135 extends into the recess 119 defined between the locating member 113 of the base member 111 and the larger proximal end 112 of the filter media 108. In the illustrated embodiment, the distance D that the larger proximal end 112 of the filter media 108 is recessed inward from the outer sidewall 117 of the locating member 113 of the base member 111 is larger than the first height $h_1$ of the inner rib 135 such that the inner rib 135 does not contact the filter media 108. Otherwise, contact between the inner rib 135 and the filter media 108 may prematurely wear or damage the filter media 108 and/or may prevent sliding movement of the air filter assembly 103 relative to the air intake housing 101, as described in more detail below.

Furthermore, in the illustrated embodiment, when the air filter assembly 103 is coupled to the air intake housing 101 such that the locating member 113 of the base member 111 of the air filter assembly 103 is retained between the inner rib 135 and the outer rib 136 of the air intake housing 101, the one or more interface surfaces 117 of the locating member 113 of the air filter assembly 103 face the inner surface 138 of the slip region 137 of the air intake housing 101. Additionally, in the illustrated embodiment, a gap 139 having a distance G is defined between the one or more interface surfaces 117 of the locating member 113 of the air filter assembly 103 and the inner surface 138 of the slip region 137 of the air intake housing 101 (e.g., the outer diameter $D_B$ of the locating member 113 of the air filter assembly 103 is smaller than an inner diameter $D_S$ of the slip region 137 of the air intake housing 101). Thus, in the illustrated embodiment, there is a clearance fit between the locating member 113 of the air filter assembly 103 and the slip region 137 of the air intake housing 101. In one or more embodiments, the distance G of the gap 139 between the one or more interface surfaces 117 of the locating member 113 of the air filter assembly 103 and the inner surface 138 of the slip region 137 of the air intake housing 101 may be selected to accommodate relative motion (e.g., sliding and/or rotating motion) between the air filter assembly 103 and the air intake housing 101, as described below. In one or more embodiments, the distance G of the gap 139 between the one or more interface surfaces 117 of the locating member 113 of the air filter assembly 103 and the inner surface 138 of the slip region 137 of the air intake housing 101 may be selected to mitigate airflow into the interior chamber of the air intake housing 101 through the outlet opening 107, which would reduce the efficiency of the automobile air filtration system 100. For instance, the distance G of the gap 139 may be selected to minimize or at least reduce hot air flowing from the engine compartment, into the outlet opening 107, past the locating member 113 of the base member 111, and into the interior cavity 122 defined in the air intake housing 101. Hot air flowing into the interior cavity 122 reduces the efficiency of the automobile air filtration system 100 by increasing the temperature of the air delivered to the engine by the air filter assembly 103. Additionally, airflow into the interior cavity 122 of the air intake housing 101 through the outlet opening 107 may reduce the efficiency of the automobile air filtration system 100 by reducing the pressure of the air inside the interior cavity 122 and thereby reducing the pressure of air delivered to the engine by the air filter assembly 103. In one or more embodiments, the distance G of the gap 139 between the one or more interface surfaces 117 of the locating member 113 of the air filter assembly 103 and the inner surface 138 of the slip region 137 of the air intake housing 101 may be selected to mitigate airflow bypassing the air filter assembly 103 (i.e., mitigate airflow from the interior cavity 122, around the locating member 113 of the air filter assembly 103, and out though the outlet opening 107), which would reduce the efficiency of the automobile air filtration system 100 by reducing the volume and/or pressure of the air delivered to the engine by the automobile air filtration system 100. In one or more embodiments, the distance G of the gap 139 between the one or more interface surfaces 117 of the locating member 113 of the air filter assembly 103 and the inner surface 138 of the slip region 137 of the air intake housing 101 may be from approximately 0.01 inch to approximately 0.6 inch. In one or more embodiments, the distance G of the gap 139 between the one or more interface surfaces 117 of the locating member 113 of the air filter assembly 103 and the inner surface 138 of the slip region 137 of the air intake housing 101 may be from approximately 0.01 inch to approximately 0.25 inch. In one or more embodiments, the distance G of the gap 139 between the one or more interface surfaces 117 of the locating member 113 of the air filter assembly 103 and the inner surface 138 of the slip region 137 of the air intake housing 101 may be from approximately 0.01 inch to approximately 0.05 inch. In one or more embodiments, the distance G of the gap 139 between the one or more interface surfaces 117 of the locating member 113 of the air filter assembly 103 and the inner surface 138 of the slip region 137 of the air intake housing 101 may be from approximately 0.01 inch to approximately 0.03 inch. In one embodiment, the distance G of the gap 139 between the one or more interface surfaces 117 of the locating member 113 of the air filter assembly 103 and the inner surface 138 of the slip region 137 of the air intake housing 101 is approximately 0.03 inch. In one embodiment, the distance G of the gap 139 between the one or more interface surfaces 117 of the locating member 113 of the air filter assembly 103 and the inner surface 138 of the slip region 137 of the air intake housing 101 is less than approximately 0.01 inch. In one or more embodiments, the distance G of the gap 139 between the one or more interface surfaces 117 of the locating member 113 of the air filter assembly 103 and the inner surface 138 of the slip region 137 of the air intake housing 101 may have any other suitable value, such as, for instance, approximately 0.01 inch, approximately 0.05 inch, approximately 0.1 inch, approximately 0.15 inch, approximately 0.2 inch, approximately 0.25 inch, approximately 0.3 inch, or approximately 0.35 inch. In one or more embodiments, the distance G of the gap 139 between the one or more interface surfaces 117 of the locating member 113 of the air filter assembly 103 and the inner surface 138 of the slip region 137 of the air intake housing 101 may be from approximately 0.4 inch to approximately 0.6 inch. In one embodiment, the distance G of the gap 139 between the one or more interface surfaces 117 of the locating member 113 of the air filter assembly 103 and the inner surface 138 of the slip region 137 of the air intake housing 101 is approximately 0.5 inch. It will be appreciated by a person of ordinary skill in the art that the distance G of the gap 139 between the one or more interface surfaces 117 of the locating member 113 of the air filter assembly 103 and the inner surface 138 of the slip region 137 of the air intake housing 101 may have any other suitable value depending, for instance, on the desired compliance between the air filter assembly 103 and the air intake housing 101 and the intended application of the automobile air filtration system 100. In one or more embodiment, the locating member 113 may be sized such that there is no gap 139 or substantially no gap 139 between the one or more interface surfaces 117 of the locating member 113 and the inner surface 138 of the slip region 138 of the air intake housing 101 (i.e., there may be a net fit between the one or more interface surfaces 117 of the locating member 113 and the inner surface 138 of the slip region 138 of the air intake housing 101).

Accordingly, the locating member 113 of the air filter assembly 103 is configured to slide (arrow 140) and/or otherwise move (e.g., rotate) in the slip region 137 of the air intake housing 101 between the inner and outer ribs 135, 136. In this manner, the engagement between the one or more interface surfaces 117 of the locating member 113 of the air filter assembly 103 and the slip region 137 of the air intake housing 101 functions as a slip joint. The slip region 137 of the air intake housing 101 between the inner rib 135 and the outer rib 136 provides compliance between the air filter assembly 103 and the air intake housing 101. For instance, when the automobile air filtration system 100 is installed in a vehicle (e.g., a car or a truck), the air intake housing 101 is configured to permit movement of the air filter assembly 103 and the intake conduit 104 relative to the air intake housing 101 (e.g., sliding movement (arrow 140) of the locating member 113 of the air filter assembly 103 along the slip region 137 between the inner and outer ribs 135, 136), such as, for instance, due to vibrations from the engine, which affect the air filter assembly 103 and the intake conduit 104 to a greater extent than the air intake housing 101, which is not directly coupled to the engine (e.g., the air intake housing 101 may be coupled to an inner fender wall of the vehicle). The compliance between the air filter assembly 103 and the air intake housing 101 is configured to protect the air filter assembly 103 and the intake conduit 104 against premature wear and failure by permitting movement (arrow 140) of the air filter assembly 103 and the intake conduit 104 relative to the air intake housing 101. In one or more embodiments, the amount by which the width W' of the slip region 137 exceeds the width W of the locating member 113 of the base member 111 of the air filter assembly 103 may be selected based upon the desired degree of compliance between the air filter assembly 103 and the air intake housing 101 depending, for instance, on the total amount movement that is expected to be imparted by the engine to the air filter assembly 103. Although in one or more embodiments, the one or more interface surfaces 117 of the locating member 113 of the air filter assembly 103 may be configured to contact (e.g., engage) the inner surface 138 of the slip region 137 of the air intake housing 101, in one or more embodiments, the distance G of the gap 139 between the one or more interface surfaces 117 of the locating member 113 of the air filter assembly 103 and the inner surface 138 of the slip region 137 of the air intake housing 101 may be selected such that the air filter assembly 103 is permitted to move (e.g., slide and/or rotate) relative to the air intake housing 101 but the locating member 113 of the air filter assembly 103 is configured not to contact (e.g., engage) the slip region 137 of the air intake housing 101.

Although in the embodiments illustrated in FIGS. 1-5, the air intake housing 101 includes two ribs 135, 136 and a single slip region 137 defined between the ribs 135, 136, in one or more embodiments, the housing may include any other suitable number of ribs, such as, for instance, from one to four or more ribs, and may include any other suitable number of slip regions, such as, for instance, two or more slip regions. Additionally, in one or more embodiments, the air intake housing 101 may not include any ribs. In one or more embodiments, the one or more slip regions defined in the air intake housing 101 may not be located between a pair of ribs (e.g., one or more of the slip regions may not be bounded by any ribs or one or more of the slip regions may include only a single rib at one end of the slip region). Furthermore, although in the illustrated embodiment the air filter assembly 103 includes a single locating member 113, in one or more embodiments, the air filter assembly 103 may include any other suitable number of locating members, such as, for instance, two or more locating members.

Figure 6A:
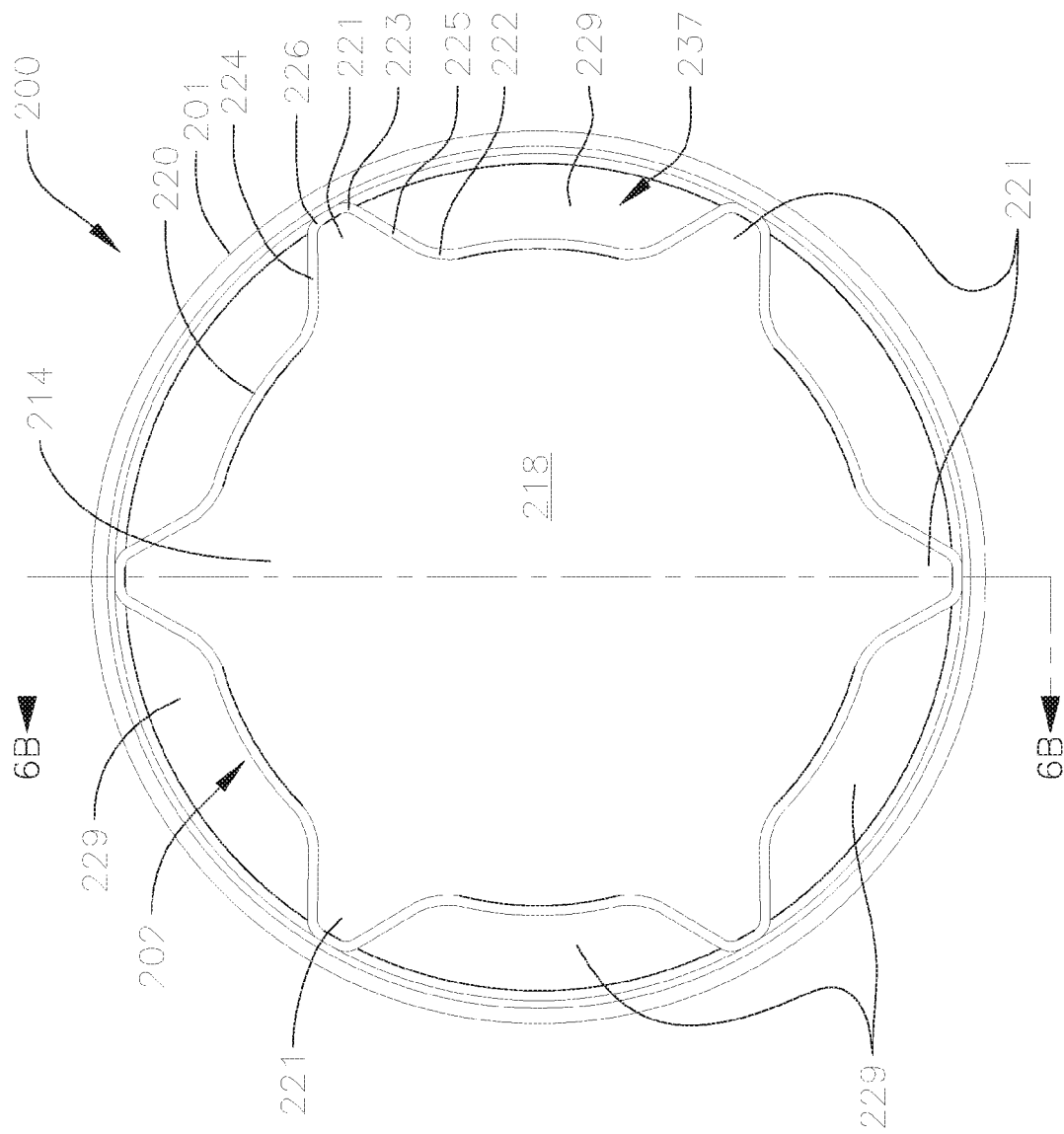

For instance, with reference now to FIGS. 6A and 6B, an automobile air filtration system 200 according to another embodiment of the present disclosure includes an air intake housing 201, an air filter assembly 202 configured to be at least partially housed in the air intake housing 201, and an intake conduit 203 (e.g., a flexible hose or a generally rigid tube) coupled to the air filter assembly 202.

The embodiment of the air intake housing 201 illustrated in FIGS. 6A-6B may be the same as or similar to the embodiment of the air intake housing 101 illustrated in FIGS. 3A-3B. In the illustrated embodiment, the air intake housing 201 includes at least one sidewall 204 defining an interior cavity or chamber 205 configured to house the air filter assembly 202. Additionally, in the illustrated embodiment, the air intake housing 201 defines a front inlet opening 206 and an outlet opening 207. The air intake housing 201 also defines an outlet passageway 208 extending to the outlet opening 207 along an outlet axis $L_O$ and a front inlet passageway 237 extending to the front inlet opening 206 along an inlet axis $L_I$. In one or more embodiments, the air intake housing 201 may define one or more side inlet openings in addition to, or instead of, the front inlet opening 206.

In the illustrated embodiment, the one or more sidewalls 204 of the air intake housing 201 define a first slip region 209 proximate the front inlet opening 206. The first slip region 209 (or a portion thereof) may be straight (or substantially straight) or curved. Additionally, in the illustrated embodiment, the air intake housing 201 includes an inner lip or rib 210 extending into the outlet passageway 208 and an outer lip or rib 211 spaced apart from the inner rib 210 and extending into the outlet passageway 208. The inner and outer ribs 210, 211 may have the same or similar configuration as the inner and outer ribs 135, 136 described above with reference to the embodiment of the air intake housing 101 illustrated in FIGS. 3A-3B. Additionally, the inner and outer ribs 210, 211 may have any suitable heights, such as, for instance, any of the heights $h_1$, $h_2$ described above with reference to the embodiment of the inner and outer ribs 135, 136 illustrated in FIGS. 3A-3B. The one or more sidewalls 204 of the air intake housing 201 also define a second slip region 212 defined between the inner rib 210 and the outer rib 211. The second slip region 212 (or a portion thereof) may be straight (or substantially straight) or curved and the second slip region 212 may have any suitable width $W_2$, such as, for instance, any of the widths W' described above with reference to the embodiment of the slip region 137 illustrated in FIGS. 3A-3B.

With continued reference to the embodiment illustrated in FIGS. 6A and 6B, the air filter assembly 202 includes filter media 213, a first locating member 214 coupled to a distal end 215 of the filter media 213, and a base member 216 coupled to a proximal end 217 of the filter media 213. Accordingly, unlike the embodiment of the air filter assembly 103 illustrated in FIGS. 2A-2B, which includes an end cap 109 coupled to the distal end 110 of the filter media 108, the embodiment of the air filter assembly 202 illustrated in FIGS. 6A-6B includes the first locating member 214 at the distal end 215 of the filter media 213.

In the embodiment illustrated in FIG. 6A, the first locating member 214 includes an outer wall 218, an inner wall 219 opposite the outer wall 218, and one or more sidewalls 220 extending between the outer wall 218 and the inner wall 219. The first locating member 214 of the may have any suitable width $W_1$ defined from the inner wall 219 to the outer wall 218, such as, for instance, from approximately ¼ inch to approximately 1 inch. In one embodiment, the width $W_1$ of the second locating member 214 is approximately ¾ inch. Additionally, in the illustrated embodiment, the first locating member 214 includes a series of locating projections 221 circumferentially arranged around an outer periphery of the first locating member 214. Although in the illustrated embodiment the first locating member 214 includes six locating projections 221, in one or more embodiments, the first locating member 214 may include any other suitable number of locating projections 221, such as, for instance, from two to twelve or more locating projections. Additionally, although in the illustrated embodiment the locating projections 221 are equidistantly spaced apart, in one or more embodiments, the locating projections 221 may be arranged in any other suitable manner (e.g., the locating projections 221 may be non-uniformly spaced apart). Additionally, in the illustrated embodiment, each of the locating projections 221 includes a wider end 222 proximate the one or more sidewalls 220 and a narrower end 223 distal the one or more sidewalls 220. In the illustrated embodiment, each locating projection 221 includes a pair of walls 224, 225 tapering from the wider proximal end 222 to the narrower distal end 223. In the illustrated embodiment, each of the locating projections 221 also includes an interface surface 226 at the narrower distal end 223 of the locating projection 221 that is configured to slidably and/or otherwise (e.g., rotatably) engage (i.e., contact) the first slip region 209 of the air intake housing 201 (i.e., each locating projection 221 includes an interface surface 226 extending between the tapered walls 224, 225 at the distal end 223 of the locating projection 221). Accordingly, in the illustrated embodiment, the first locating member 214 includes a series of discrete interfaces surfaces 226 configured to slidably and/or otherwise (e.g., rotatably) contact the first slip region 209 of the air intake housing 201. Additionally, in the illustrated embodiment, the locating projections 221 of the first locating member 214 project radially outward beyond the distal end 215 of the filter media 213. Accordingly, in the illustrated embodiment, the distal end 215 of the filter media 213 is recessed inward from the interface surfaces 226 of the first locating member 214.

In the illustrated embodiment, a gap 227 is defined between the interface surfaces 221 of the first locating member 214 and an inner surface 228 of the first slip region 209 of the air intake housing 201. In one or more embodiments, a distance $G_1$ of the gap 227 between the interface surfaces 221 of the first locating member 214 and the inner surface 228 of the first slip region 209 of the air intake housing 201 may have any suitable value, such as, for instance, any of the values described above for the distance G of the gap 139 in the embodiment of the air filter assembly 103 and the air intake housing 101 illustrated in FIGS. 4-5 (e.g., from approximately 0.01 inch to approximately 0.6 inch). In one or more embodiment, the first locating member 214 may be sized such that there is no gap 227 or substantially no gap 227 between interface surfaces 221 of the first locating member 214 and the inner surface 228 of the first slip region 209 of the air intake housing 201 (i.e., there may be a net fit between the interface surfaces 221 of the first locating member 214 and the inner surface 228 of the first slip region 209 of the air intake housing 201).

Additionally, in the illustrated embodiment, scallops or notches 229 are defined between adjacent locating projections 221 on the first locating member 214. When the air filter assembly 202 is installed in the air intake housing 201, the notches 229 function as airflow passageways permitting air to flow in through the front inlet opening 206 in the air intake housing 201, past the first locating member 214, and through the filter media 213 (i.e., the shape of the first locating member 214 permits sufficient airflow to flow through the front inlet opening 206 and into the filter media 213). In one or more alternate embodiments, the first locating member 214 may have any other suitable shape, such as, for instance, any suitable prismatic shape, and/or any other suitable features (e.g., openings) configured to permit sufficient airflow through the front inlet opening 206, past the first locating member 214, and through the filter media 213. In one or more embodiments, the first locating member 214 may have a size and shape that would obstruct or substantially obstruct airflow around or through the first locating member 214, and the air intake housing 201 may be provided without the front air inlet opening 206 (e.g., the air intake housing 201 may be provided with only one or more side air inlet openings).

Still referring to the embodiment illustrated in FIGS. 6A-6B, the base member 216 of the air filter assembly 202 includes a second locating member 230 and a cuff (i.e., conduit support flange or lip) 231 extending outward from the second locating member 230. The base member 216 of the of the air filter assembly 202 may be the same or similar to the base member 111 of the embodiment of the air filter assembly 103 illustrated in FIG. 2A-2B. In the illustrated embodiment, the second locating member 230 of the base member 216 includes an inner wall 232, an outer wall 233 opposite the inner wall 232, and a sidewall having one or more interface surfaces 234 extending between the inner wall 232 and the outer wall 233. The second locating member 230 of the base member 216 may have any suitable width $W_2$ defined from the inner wall 232 to the outer wall 233, such as, for instance, from approximately ¼ inch to approximately 1 inch. In one embodiment, the width $W_2$ of the second locating member 230 of the base member 216 is approximately ¾ inch. Although in the illustrated embodiment the second locating member 230 of the base member 216 is a cylindrical or a substantially cylindrical member, in one or more embodiments the second locating member 230 of the base member 216 of the air filter assembly 202 may have any other suitable shape. Additionally, although in the illustrated embodiment the one or more interface surfaces 234 of the second locating member 230 have a straight or substantially straight cross-sectional shape in a plane extending through the outlet axis $L_O$ of the air intake housing 101, the one or more interface surfaces 234 of the second locating member 230 may have any other suitable shape (e.g., the one or more interface surfaces 234 of the second locating member 230 may be curved or rounded in cross-section).

Additionally, in the illustrated embodiment, a gap 238 having a distance $G_2$ is defined between the one or more interface surfaces 234 of the second locating member 230 of the air filter assembly 202 and an inner surface 239 of the second slip region 212 of the air intake housing 201. The distance $G_2$ of the gap 238 between the one or more interface surfaces 234 of the second locating member 230 and the inner surface 239 of the second slip region 212 of the air intake housing 201 may have any suitable value, such as, for instance, any of the values described above for the distance G of the gap 139 in the embodiment of the air filter assembly 103 and the air intake housing 101 illustrated in FIGS. 4-5 (e.g., from approximately 0.01 inch to approximately 0.6 inch) in order to mitigate hot airflow from the engine compartment into the interior cavity 205 of the air intake housing 201 through the outlet opening 207 and/or to mitigate airflow bypassing the air filter assembly 202 by flowing from the interior cavity 205, around the second locating member 230 of the air filter assembly 202, and out though the outlet opening 207.

Still referring to the embodiment illustrated in FIGS. 6A-6B, the second locating member 230 of the base member 216 is larger than the proximal end 217 of the filter media 213 such that the proximal end 217 of the filter media 213 is recessed inward from the one or more interface surfaces 234 of the second locating member 230 of the base member 216 (e.g., an outer diameter of the second locating member 230 of the base member 216 is larger than an outer diameter of the proximal end 217 of the filter media 213). The proximal end 217 of the filter media 213 may be recessed inward from the interface surface 234 of the second locating member 230 of the base member 216 by any suitable distance D, such as, for instance, from approximately ⅛ inch to approximately ⅝ inch. In one embodiment, the proximal end 217 of the filter media 213 is recessed inward from the interface surface 234 of the second locating member 230 of the base member 216 by approximately ⅜ inch. Accordingly, in the illustrated embodiment, a recess 235 is defined between the second locating member 230 of the base member 216 and the proximal end 217 of the filter media 213, which is configured to prevent the filter media 213 from contacting the inner rib 210 of the air intake housing 201.

With continued reference to the embodiment illustrated in FIG. 6B, the proximal end 217 of the filter media 213 is larger than the distal end 215 of the filter media 213 (e.g., the proximal end 217 has a larger diameter than the distal end 215 of the filter media 213) such that the filter media 213 tapers between the larger proximal end 217 and the smaller distal end 215. Accordingly, in the illustrated embodiment, the filter media 213 of the air filter assembly 202 is frusto-conical. In one or more alternate embodiments, the filter media 213 of the air filter assembly 202 may have any other suitable shape, such as, for instance, cylindrical. Additionally, in the illustrated embodiment the filter media 213 is pleated, although in one or more alternate embodiments, the filter media 213 may have any other suitable configuration (e.g., non-pleated). The filter media 213 may be made out of any suitably porous material configured to filter particulate matter from air flowing into the air intake housing 201, such as, for instance, natural fibers (e.g., cotton), a synthetic material (e.g., a non-woven synthetic material), or combinations thereof.

When the air filter assembly 202 is installed in the air intake housing 201, the interface surfaces 226 of the first locating member 214 are configured to slide (arrow 236) in the first slip region 209 of the air intake housing 201 and the one or more interface surfaces 234 of the second locating member 230 are configured to slide (arrow 237) in the second slip region 212 of the air intake housing 201 defined between the inner and outer ribs 210, 211. In this manner, the first and second slip regions 209, 212 of the air intake housing 201 provide compliance between the air filter assembly 202 and the air intake housing 201, which is configured to protect the air filter assembly 202 and the intake conduit 203 against premature wear and failure by permitting movement (arrows 236, 237) of the air filter assembly 202 and the intake conduit 203 relative to the air intake housing 201 due to, for instance, engine vibrations. In one or more embodiments, the amount by which the width $W_{2'}$ of the second slip region 212 exceeds the width $W_2$ of the second locating member 230 of the base member 216 of the air filter assembly 202 may be selected based upon the desired degree of compliance between the air filter assembly 202 and the air intake housing 201 depending, for instance, on the total amount movement that is expected to be imparted by the engine to the air filter assembly 202.

Based on the foregoing description, it will be appreciated that the embodiment of the air filter assembly 202 illustrated in FIGS. 6A-6B has two locating members 214, 230 at the distal and proximal ends 215, 217 (i.e., opposite ends) of the filter media 213 that are configured to slidably and/or otherwise (e.g., rotatably) engage the air intake housing 201 whereas the embodiment of the air filter assembly 101 illustrated in FIGS. 2A, 2B, 4, and 5 includes a single locating member 113 at the distal end 110 of the filter media 108 that is configured to slidably and/or otherwise (e.g., rotatably) engage the air intake housing 101.

Additionally, although in the embodiment of the air intake housing 201 illustrated in FIGS. 6A-6B the second slip region 212 is defined between the inner and outer ribs 210, 211, in one or more embodiments, the first slip region 209 may be defined between a pair of ribs instead of, or in addition, to the second slip region 212. For instance, in one or more embodiments, both the first and second slip regions 209, 212 may be defined between a pair of inner and outer ribs. In one or more embodiments, the first slip region 209 may be defined between a pair of ribs extending into the front inlet passageway 237 and the air intake housing 201 may include one rib at one end of the second slip region 212 or the air intake housing 201 may be provided without ribs at either end of the second slip region 212.

Figure 7:
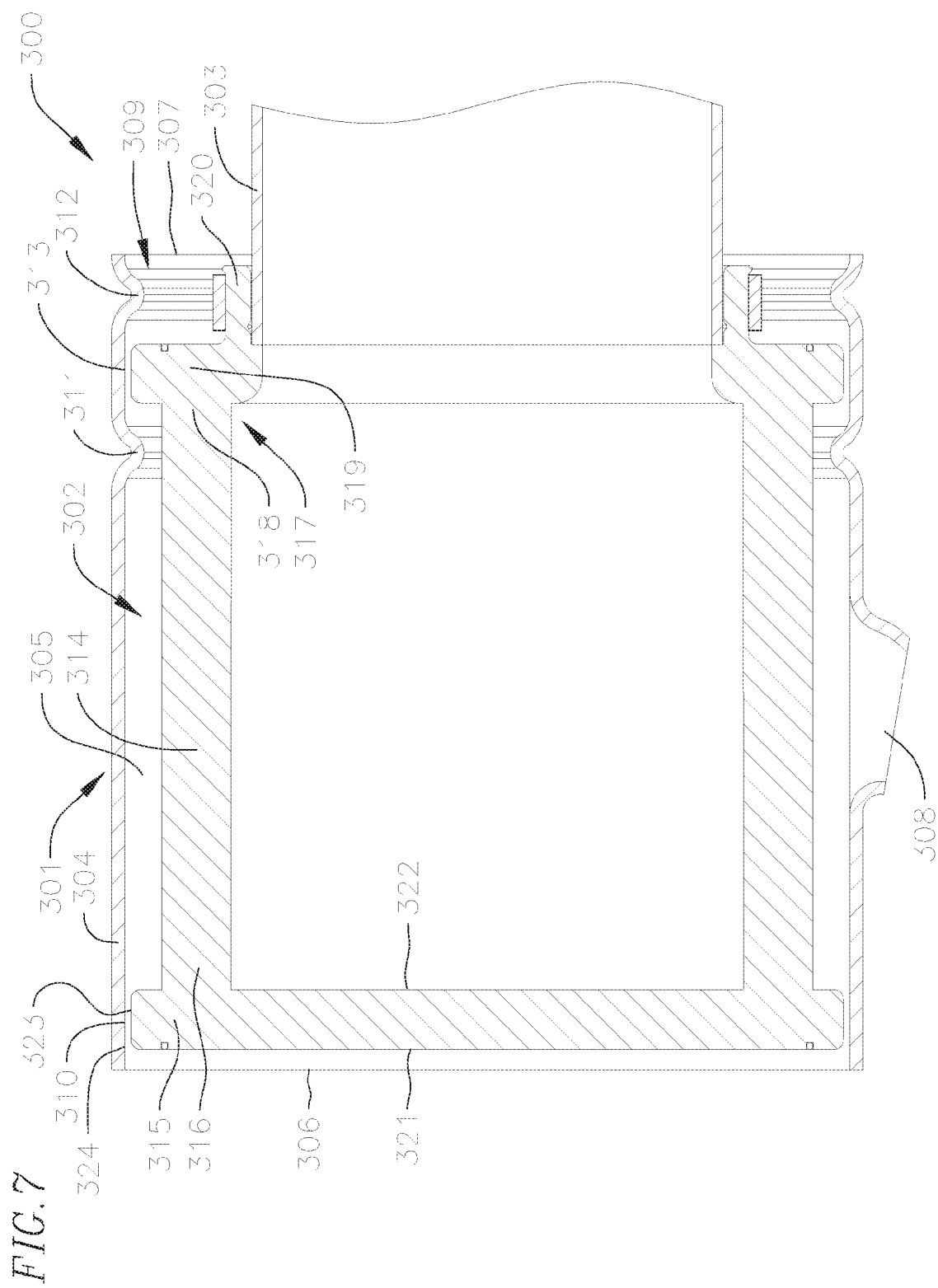
FIG. 7 is a cross-sectional view of an automotive air filtration system according to a further embodiment of the present disclosure.

With reference now to FIG. 7, an automobile air filtration system 300 according to another embodiment of the present disclosure includes an air intake housing 301, an air filter assembly 302 configured to be at least partially housed in the air intake housing 301, and an intake conduit 303 (e.g., a flexible hose or a generally rigid tube) coupled to the air filter assembly 302. In the illustrated embodiment, the air intake housing 301 includes at least one sidewall 304 defining an interior cavity or chamber 305 configured to house the air filter assembly 302. Additionally, in the illustrated embodiment, the air intake housing 301 defines a front inlet opening 306, an outlet opening 307, and at least one side inlet opening 308. The air intake housing 301 also defines an outlet passageway 309 extending to the outlet opening 307.

Additionally, in the illustrated embodiment, the one or more sidewalls 304 of the air intake housing 301 define a first slip region 310 proximate the front inlet opening 306. The first slip region 310 (or a portion thereof) may be straight (or substantially straight) or curved. Additionally, in the illustrated embodiment, the air intake housing 301 includes an inner lip or rib 311 extending into the outlet passageway 309 and an outer lip or rib 312 spaced apart from the inner rib 311 and extending into the outlet passageway 309. The inner and outer ribs 311, 312 may have the same or similar configuration as the inner and outer ribs 135, 136 described above with reference to the embodiment of the air intake housing 101 illustrated in FIGS. 3A-4. The one or more sidewalls 304 of the air intake housing 301 also define a second slip region 313 defined between the inner rib 311 and the outer rib 312.

With continued reference to the embodiment illustrated in FIG. 7, the air filter assembly 302 includes filter media 314, a first locating member 315 coupled to a distal end 316 of the filter media 314, and a base member 317 coupled to a proximal end 318 of the filter media 314. The base member 317 of the air filter assembly 302 includes a second locating member 319 and a cuff (i.e., conduit support flange or lip) 320 extending outward from the second locating member 319. In the illustrated embodiment, the filter media 314 of the air filter assembly 302 extends straight or substantially straight from the first locating member 315 to the second locating member 319 (e.g., the filter media 314 does not taper). In one or more embodiments, the base member 317 of the air filter assembly 302 may be the same or similar as the embodiment of the base member 216 illustrated in FIGS. 6A-6B. In the illustrated embodiment, the first locating member 315 includes an outer wall 321, an inner wall 322 opposite the outer wall 321, and a sidewall having one or more interface surfaces 323 extending between the outer wall 321 and the inner wall 322. The one or more interface surfaces 323 of the first locating member 315 are configured to slidably and/or otherwise (e.g., rotatably) engage (i.e., contact) the first slip region 310 of the air intake housing 301. Similarly, the second locating member 319 is configured to slidably and/or otherwise (e.g., rotatably) engage (i.e., contact) the second slip region 313 of the air intake housing 301.

In the illustrated embodiment, the shape of the first locating member 315 matches or substantially matches the shape of the front inlet opening 306. For instance, in one or more embodiments, the first locating member 315 and the front inlet opening 306 may both be circular. Additionally, in one or more embodiments, the first locating member 315 may be sized such that there is no gap, substantially no gap, or only a slight gap between the one or more interface surfaces 323 of the first locating member 315 and an inner surface 324 of the first slip region 310 of the air intake housing 301 (e.g., there may be a net fit between the one or more interface surfaces 323 of the first locating member 315 and the inner surface 324 of the first slip region 310 of the air intake housing 301). Accordingly, in one or more embodiments, the first locating member 315 may be configured to obstruct or substantially obstruct airflow through the front inlet opening 306. In one or more embodiments, all or substantially all of the airflow through the air filter assembly 302 enters through the one or more side inlet openings 308 in the air intake housing 301.

Figure 8:
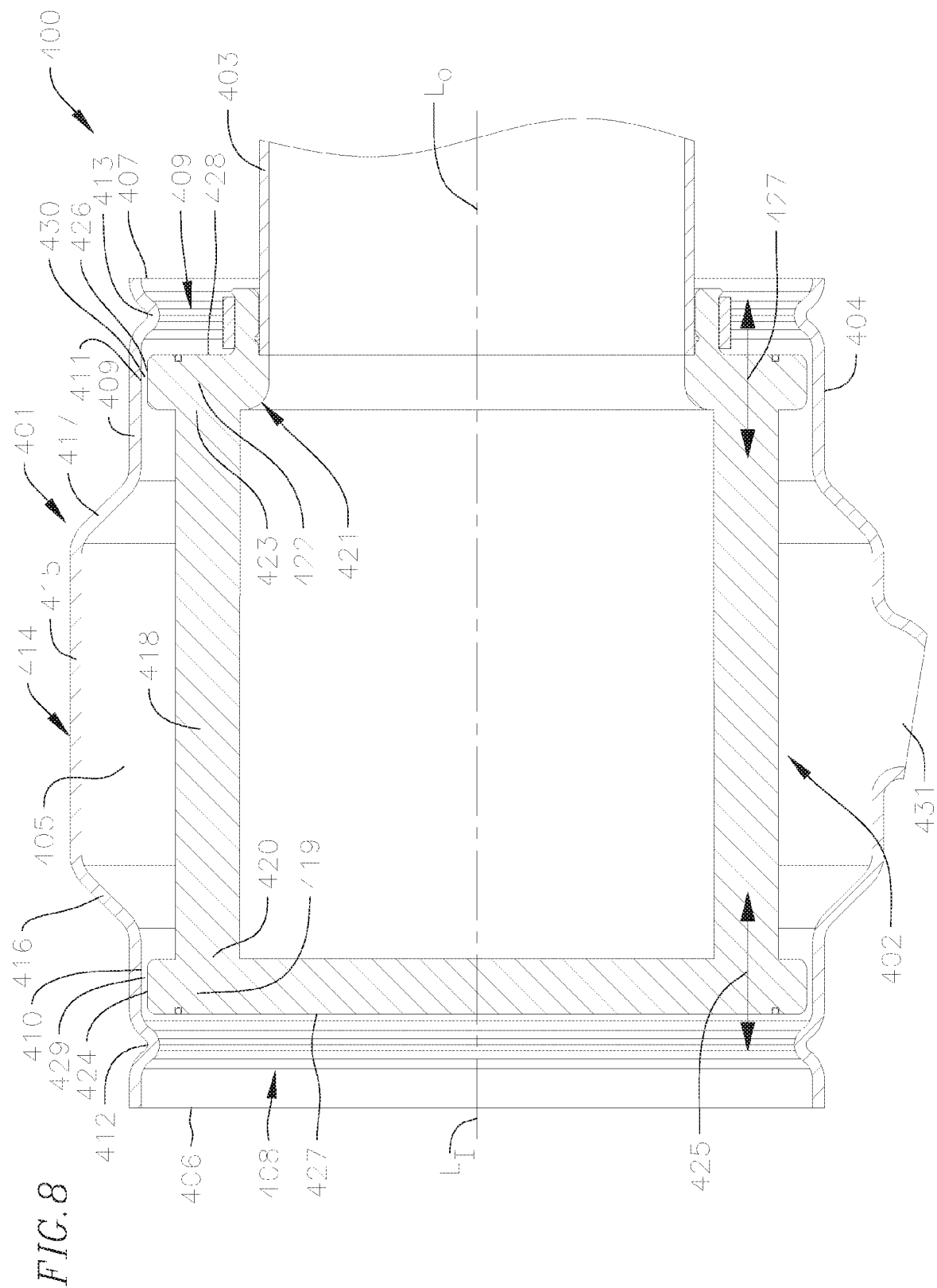
FIG. 8 is a cross-sectional view of an automotive air filtration system according to a further embodiment of the present disclosure.

With reference now to FIG. 8, an automobile air filtration system 400 according to another embodiment of the present disclosure includes an air intake housing 401, an air filter assembly 402 configured to be at least partially housed in the air intake housing 401, and an intake conduit 403 (e.g., a flexible hose or a generally rigid tube) coupled to the air filter assembly 402.

In the illustrated embodiment, the air intake housing 401 includes at least one sidewall 404 defining an interior cavity 405 configured to house the air filter assembly 402. Additionally, in the illustrated embodiment, the air intake housing 401 defines a front inlet opening 406, an outlet opening 407, and at least one side inlet opening 431. The air intake housing 401 also defines a front inlet passageway 408 extending to the front inlet opening 406 along an inlet axis $L_I$ and an outlet passageway 409 extending to the outlet opening 407 along an outlet axis $L_O$. Although in the illustrated embodiment the inlet axis $L_I$ and the outlet axis $L_O$ are coaxial, in one or more alternate embodiments, the inlet axis $L_I$ and the outlet axis $L_O$ may not be coaxial.

Additionally, in the illustrated embodiment, the one or more sidewalls 404 of the air intake housing 401 define a first slip region 410 proximate the front inlet opening 406 and a second slip region 411 proximate the outlet opening 407. The first slip region 410 (or a portion thereof) may be straight (or substantially straight) or curved and the second slip region 411 (or a portion thereof) may be straight (or substantially straight) or curved. Additionally, in the illustrated embodiment, the air intake housing 401 includes an inner lip or rib 412 extending into the front inlet passageway 408 and an outer lip or rib 413 spaced apart from the inner rib 412 and extending into the outlet passageway 408. In the illustrated embodiment, the inner rib 412 is located at one end of the first slip region 410 (e.g., an inner end of the first slip region 410) and the outer rib 413 is located at one end of the second slip region 411 (e.g., an outer end of the second slip region 411). In one or more embodiments, the inner rib 412 may be located at an outer end of the first slip region 410 and the outer rib 413 may be located at an inner end of the second slip region 411. Although in the illustrated embodiment the inner and outer ribs 412, 413 are located at opposite ends of the first and second slip regions 410, 411, respectively, in one or more alternate embodiments, the inner and outer ribs 412, 413 may be located at the same ends of the first and second slip regions 410, 411, respectively (e.g., the inner and outer ribs 412, 413 may be located at the inner ends of the first and second slip regions 410, 411, respectively, or the inner and outer ribs 412, 413 may be located at the outer ends of the first and second slip regions 410, 411, respectively). Additionally, in one or more embodiments, the air intake housing 401 may include any other suitable number of ribs. For instance, in one or more embodiments, the air intake housing 401 may include a third rib at the outer end of the first slip region 410 or the inner end of the second slip region 411. In one or more embodiments, the air intake housing 401 may include third and fourth ribs at the outer end of the first slip region 410 and the inner end of the second slip region 411, respectively (i.e., the air intake housing 401 may include two ribs at inner and outer ends of the first slip region 410 and two ribs at the inner and outer ends of the second slip region 411). Additionally, in one or more embodiments, the air intake housing 401 may be provided without the one or more ribs at the first slip region 410 and/or without the one or more ribs at the second slip region 411.

The inner and outer ribs 412, 413 may have the same or similar configuration as the inner and outer ribs 135, 136 described above with reference to the embodiment of the air intake housing 101 illustrated in FIGS. 3A-4. Additionally, the inner and outer ribs 412, 413 may have any suitable heights, such as, for instance, any of the heights $h_1$, $h_2$ described above with reference to the embodiment of the inner and outer ribs 135, 136 illustrated in FIGS. 3A-4.

Additionally, in the embodiment illustrated in FIG. 8, an intermediate portion of the air intake housing 401 between the front inlet opening 406 and the outlet opening 407 includes a raised portion 414. In the illustrated embodiment, the raised portion 414 includes one or more outer sidewall segments 415 spaced outward apart from the portions of the at least one sidewall 404 defining the first and second slip regions 410, 411. Additionally, in the illustrated embodiment, the raised portion 414 of the air intake housing 401 includes one or more inner ramp segments 416 connecting the portion of the at least one sidewall 404 defining the first slip region 410 to the one or more outer sidewall segments 415 and one or more outer ramp segments 417 connecting the one or more outer sidewall segments 415 to the portion of the at least one sidewall 404 defining the second slip region 411. In the illustrated embodiment, the one or more side inlet openings 431 are defined in the raised portion 414 of the air intake housing 401. The raised portion 414 of the air intake housing 401 is configured to increase the volume of the interior chamber 405 at the intermediate portion of the air intake housing 401, which is configure to aid in increasing and/or improving airflow through the interior chamber 405 of the air intake housing 401 and through the air filter assembly 402.

With continued reference to the embodiment illustrated in FIG. 8, the air filter assembly 402 may be the same or similar to the embodiment of the air filter assembly 302 illustrated in FIG. 7. In the illustrated embodiment, the air filter assembly 402 includes filter media 418, a first locating member 419 coupled to a distal end 420 of the filter media 418, and a base member 421 having a second locating member 422 coupled to a proximal end 423 of the filter media 418. In the illustrated embodiment, the filter media 418 of the air filter assembly 402 extends straight or substantially straight from the first locating member 419 to the second locating member 422 (e.g., the filter media 418 does not taper).

When the air filter assembly 402 is installed in the air intake housing 401, the first and second locating members 419, 422 are retained between the inner and outer ribs 412, 413. Additionally, one or more interface surfaces 424 of the first locating member 419 are configured to slide (arrow 425) in the first slip region 410 of the air intake housing 401 and one or more interface surfaces 426 of the second locating member 422 is configured to slide (arrow 427) in the second slip region 411 of the air intake housing 401. In this manner, the first and second slip regions 410, 411 of the air intake housing 401 provide compliance between the air filter assembly 402 and the air intake housing 401, which is configured to protect the air filter assembly 402 and the intake conduit 403 against premature wear and failure by permitting movement (arrows 425, 427) of the air filter assembly 402 and the intake conduit 403 relative to the air intake housing 401 due to, for instance, engine vibrations. In the illustrated embodiment, the spacing between the inner rib 412 and the outer rib 413 may be selected based upon the desired degree of compliance between the air filter assembly 402 and the air intake housing 401 depending, for instance, on the total amount movement that is expected to be imparted by the engine to the air filter assembly 402. For instance, in one or more embodiments, the air filter assembly 402 may be configured to slide (arrows 425, 427) by an amount up to the difference between the spacing between the inner rib 412 and the outer rib 413 and the spacing between an inner wall 427 of the first locating member 419 and an outer wall 428 of the second locating member 422.

Additionally, in the illustrated embodiment, gaps 429, 430 are defined between the one or more interface surfaces 424 of the first locating member 419 and the first slip region 410 and between the one or more interface surfaces 426 of the second locating member 422 and the second slip region 411, respectively. The gaps 429, 430 may have any suitable values, such as, for instance, any of the values described above for the gap 139 defined between the embodiments of the air filter assembly 103 and the air intake housing 101 illustrated in FIG. 4. In one or more embodiments, the first locating member 419 and/or the second locating member 422 may be sized such that there is no gap 429, 430 and/or or substantially no gap 429, 430 between the one or more interface surfaces 424 of the first locating member 419 and the first slip region 410 of the air intake housing 401 and/or between the one or more interface surfaces 426 of the second locating member 422 and the second slip region 411 of the air intake housing 401 (i.e., there may be a net fit between the one or more interface surfaces 424 of the first locating member 419 and the first slip region 410 of the air intake housing 201 and/or a net fit between the one or more interface surfaces 426 of the second locating member 422 and the second slip region 411 of the air intake housing 401).

Additionally, in the illustrated embodiment, the size and shape of the first locating member 419 matches or substantially matches the size and shape of the front inlet opening 406. For instance, in one or more embodiments, the first locating member 419 and the front inlet opening 406 may both be circular. Accordingly, in one or more embodiments, the first locating member 419 may be configured to obstruct or substantially obstruct airflow through the front inlet opening 406. Accordingly, in one or more embodiments, all or substantially all of the airflow through the air filter assembly 402 enters through the one or more side inlet openings 431 in the air intake housing 401.

Figure 9:
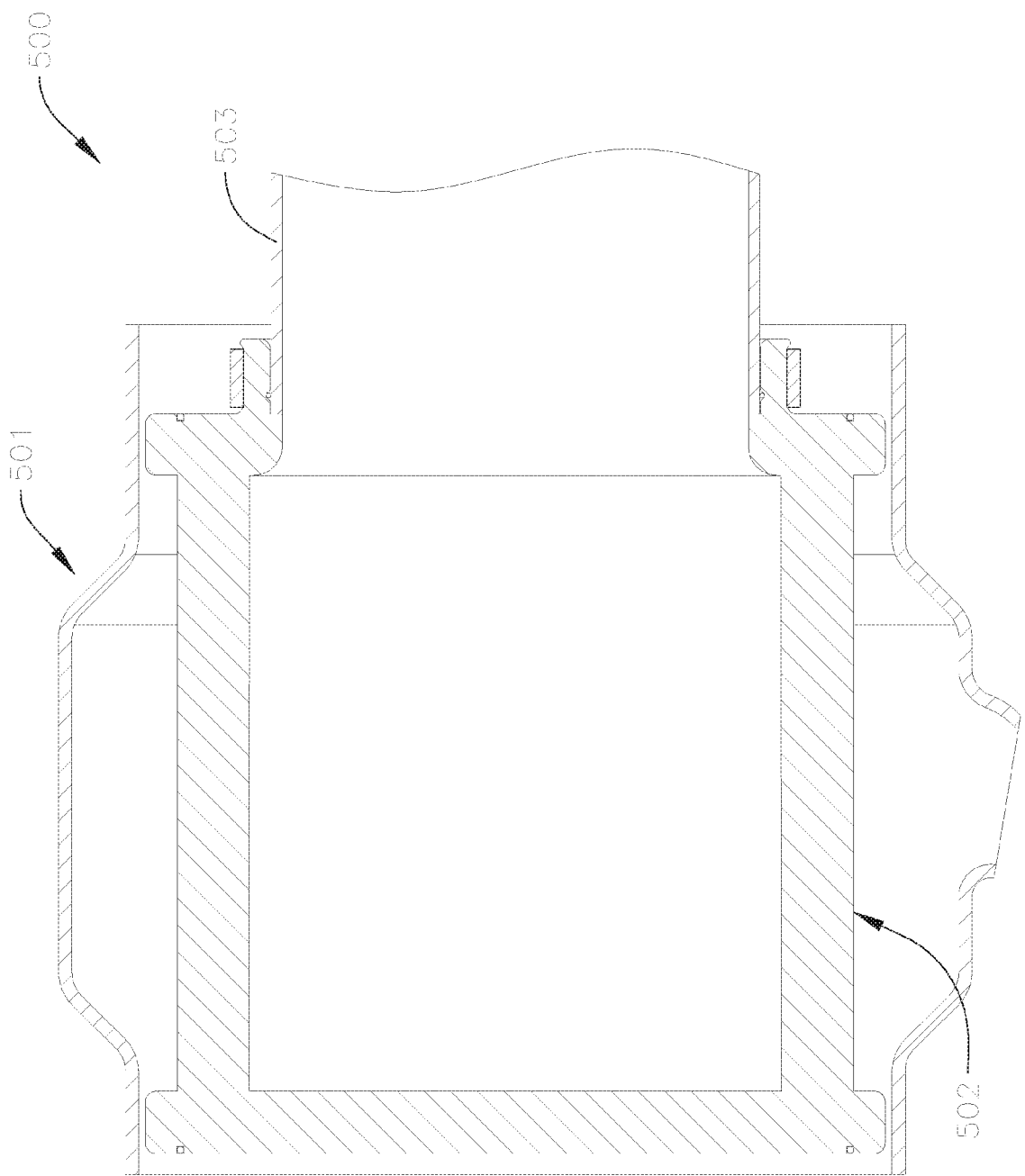
FIG. 9 is a cross-sectional view of an automotive air filtration system according to a further embodiment of the present disclosure.

With reference now to FIG. 9, an automobile air filtration system 500 according to another embodiment of the present disclosure includes an air intake housing 501, an air filter assembly 502 configured to be at least partially housed in the air intake housing 501, and an intake conduit 503 (e.g., a flexible hose or a generally rigid tube) coupled to the air filter assembly 502. The air filter assembly 502 may be the same or similar to the embodiment of the air filter assembly 402 illustrated in FIG. 8 and the air intake housing 501 may be the same or similar to the embodiment of the air intake housing 401 illustrated in FIG. 8 except the air intake housing 501 is provided without the ribs 412, 413.

Figure 10:
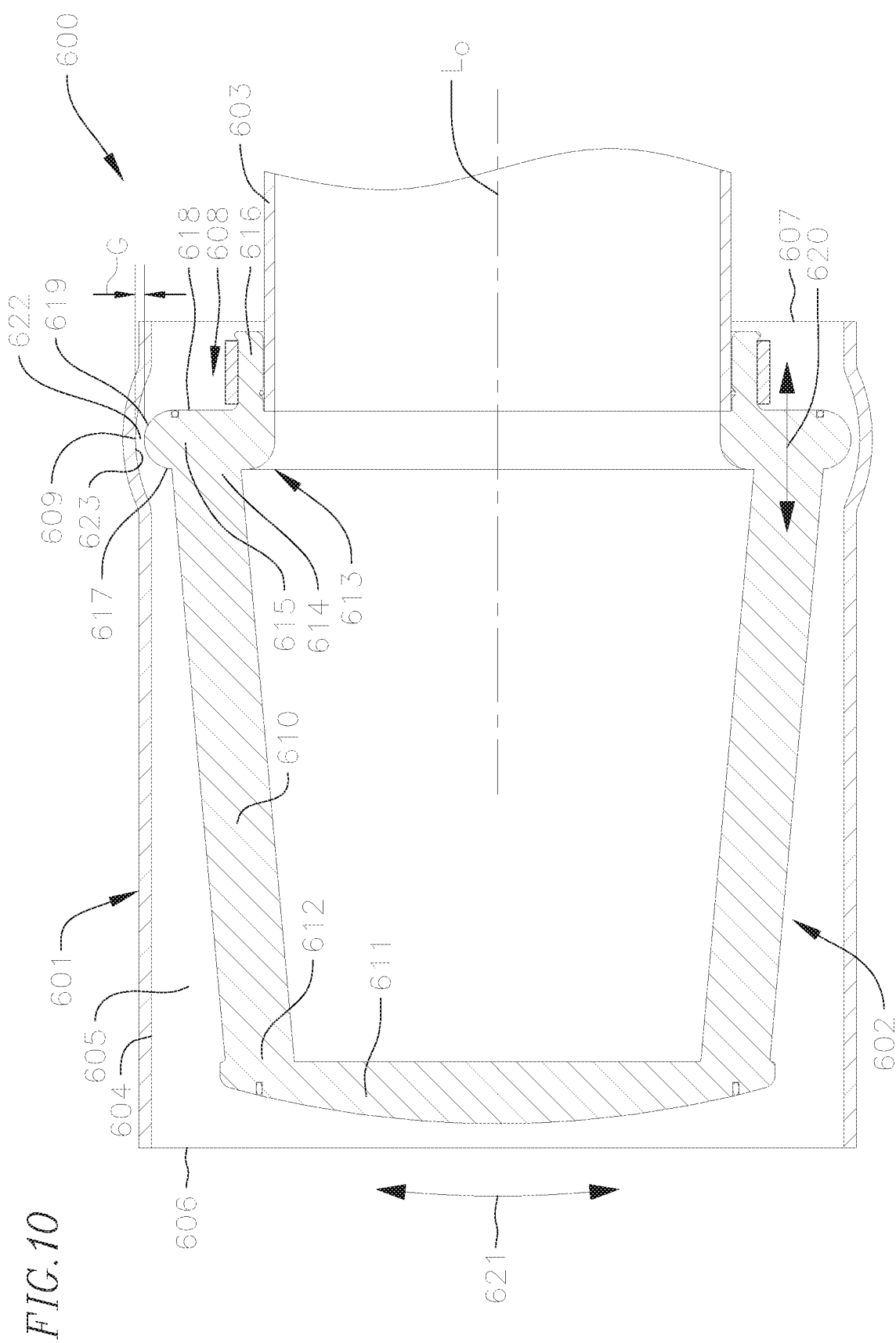
FIG. 10 is a cross-sectional view of an automotive air filtration system according to a further embodiment of the present disclosure.

With reference now to FIG. 10, an automobile air filtration system 600 according to another embodiment of the present disclosure includes an air intake housing 601, an air filter assembly 602 configured to be at least partially housed in the air intake housing 601, and an intake conduit 603 (e.g., a flexible hose or a generally rigid tube) coupled to the air filter assembly 602.

In the illustrated embodiment, the air intake housing 601 includes at least one sidewall 604 defining an interior cavity 605 configured to house the air filter assembly 602. Additionally, in the illustrated embodiment, the air intake housing 601 defines a front inlet opening 606 and an outlet opening 607. The air intake housing 601 also defines an outlet passageway 608 extending to the outlet opening 607 along an outlet axis $L_O$. In one or more embodiments, the air intake housing 601 may define one or more side inlet openings in addition to, or instead of, the front inlet opening 606.

Additionally, in the illustrated embodiment, the one or more sidewalls 604 of the air intake housing 601 define a slip region 609 proximate the outlet opening 607. In the illustrated embodiment, the slip region 609 is curved and extends away from the outlet axis $L_O$ (i.e., the slip region 609 has a curved cross-sectional shape in a plane extending through the outlet axis $L_O$). The slip region 609 may have any suitable curvature, such as, for instance, parabolic, elliptical, hyperbolic, circular, or combinations and/or portions thereof.

With continued reference to the embodiment illustrated in FIG. 10, the air filter assembly 602 includes filter media 610, an end cap 611 coupled to a distal end 612 of the filter media 610, and a base member 613 coupled to a proximal end 614 of the filter media 613. The base member 613 includes a locating member 615 and a cuff (i.e., conduit support flange or lip) 616 extending outward from the locating member 615. In the illustrated embodiment, the locating member 615 of the base member 613 includes an inner wall 617, an outer wall 618 opposite the inner wall 617, and a sidewall having one or more interface surfaces 619 extending between the inner wall 617 and the outer wall 618. The locating member 615 may have any suitable width W defined from the inner wall 617 to the outer wall 618, such as, for instance, from approximately ¼ inch to approximately 1 inch. In one embodiment, the width W of the locating member 615 of the base member 613 is approximately ¾ inch. Although in the illustrated embodiment the locating member 615 of the base member 613 is a generally cylindrical member, in one or more embodiments the locating member 615 of the air filter assembly 602 may have any other suitable shape. Additionally, in the illustrated embodiment, the one or more interface surfaces 619 of the locating member 615 have a curved (e.g., rounded) cross-sectional shape in a plane extending through the outlet axis $L_O$. The one or more interface surfaces 619 may have any suitable curvature, such as, for instance, parabolic, elliptical, hyperbolic, circular, or combinations and/or portions thereof. In the illustrated embodiment, the curvature of the one or more interface surfaces 619 of the locating member 615 may be smaller than the curvature of the slip region 609 of the air intake housing 601 (e.g., the one or more interface surfaces 619 of the locating member 615 may have a smaller radius of curvature than the slip region 609 of the air intake housing 601). In one or more embodiments, the air filter assembly 602 may include a second locating member rather than an end cap 611 at the distal end 612 of the filter media 610 and the air intake housing 601 may define a second slip region corresponding to the second locating member. In one or more embodiments, the second locating member and the second slip region may be the same as or similar to the locating member 615 and the slip region 609, respectively.

When the air filter assembly 602 is installed in the air intake housing 601, the locating member 615 of the air filter assembly 602 is located in the slip region 609 of the air intake housing 601. In one or more embodiments, the locating member 615 is configured to slide (arrow 620) in the slip region 609 of the air intake housing 601. Additionally, due to the curvature of the interface surface 619 of the air filter assembly 602 and the curvature of the slip region 609 of the air intake housing 601, the air filter assembly 602 is configured to tilt (e.g., rock) (arrow 621), such as, for instance, due to engine vibrations. In this manner, the slip region 609 of the air intake housing 601 provides compliance between the air filter assembly 602 and the air intake housing 601, which is configured to protect the air filter assembly 602 and the intake conduit 603 against premature wear and failure by permitting movement (arrows 620, 621) of the air filter assembly 602 and the intake conduit 603 relative to the air intake housing 601 due to, for instance, engine vibrations. In the illustrated embodiment, the size and curvature of the interface surface 619 and the size and curvature of the slip region 609 may be selected based upon the desired degree of compliance between the air filter assembly 602 and the air intake housing 601 depending, for instance, on the total amount movement that is expected to be imparted by the engine to the air filter assembly 602.

Additionally, in the illustrated embodiment, a gap 622 having a distance G is defined between the one or more interface surfaces 619 of the locating member 615 of the air filter assembly 602 and an inner surface 623 of the slip region 609 of the air intake housing 601. The distance G of the gap 622 between the one or more interface surfaces 619 of the locating member 615 and the inner surface 623 of the slip region 609 of the air intake housing 601 may have any suitable value, such as, for instance, any of the values described above for the distance G of the gap 139 in the embodiment of the air filter assembly 103 and the air intake housing 101 illustrated in FIGS. 4-5 (e.g., from approximately 0.01 inch to approximately 0.6 inch) in order to mitigate hot airflow from the engine compartment into the interior cavity 605 of the air intake housing 601 through the outlet opening 607 and/or to mitigate airflow bypassing the air filter assembly 602 by flowing from the interior cavity 605, around the locating member 615 of the air filter assembly 602, and out though the outlet opening 607.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "inner," "outer," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween. Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

What is claimed is:

1. An automobile air filtration system, comprising:
   an air filter assembly, comprising:
      filter media having a first end and a second end; and
      a base member coupled to the second end of the filter media, the base member comprising a locating member having a first width; and
   an air intake housing configured to house the air filter assembly, the air intake housing comprising:
      at least one sidewall defining an interior chamber;
      an inlet opening defined in the at least one sidewall;
      an outlet opening defined in the at least one sidewall;
      an outlet passageway defined by a portion of the at least one sidewall, the outlet passageway extending to the outlet opening along an outlet axis; and
      a slip region defined in the portion of the at least one sidewall defining the outlet passageway, the slip region having a second width greater than the first width of the locating member of the air filter assembly,
         wherein, when the air filter assembly is received in the interior chamber of the air intake housing, the locating member of the air filter assembly is movably received in the slip region of the air intake housing along the outlet axis.

2. The automobile air filtration system of claim 1, wherein the air intake housing further comprises an outer rib projecting from the portion of the at least one sidewall into the outlet passageway, the outer rib located at a first end of the slip region.

3. The automobile air filtration system of claim 2, wherein the air intake housing further comprises an inner rib projecting from the portion of the at least one sidewall into the outlet passageway, the inner rib spaced apart from the outer rib and located at a second end of the slip region.

4. The automobile air filtration system of claim 3, wherein the inner rib is substantially parallel to the outer rib.

5. The automobile air filtration system of claim 3, wherein the air filter assembly is movably disposed in the slip region between the inner rib and the outer rib.

6. The automobile air filtration system of claim 3, wherein the inner rib has a first height and the outer rib has a second height less than the first height.

7. The automobile air filtration system of claim 1, wherein the slip region is substantially straight, and wherein the slip region is substantially parallel to the outlet axis.

8. The automobile air filtration system of claim 1, wherein at least a portion of the slip region is curved in cross-section and wherein at least a portion of an interface surface of the locating member is curved in cross-section.

9. The automobile air filtration system of claim 1, wherein, when the air filter assembly is installed in the air intake housing, an interface surface of the locating member of the air filter assembly is spaced apart by a gap from an inner surface of the slip region of the air intake housing.

10. The automobile air filtration system of claim 9, wherein the gap has a distance from approximately 0.01 inch to approximately 0.6 inch.

11. The automobile air filtration system of claim 1, wherein the second end of the filter media is larger than the first end of the filter media, and wherein the second end of the filter media is recessed inward from an interface surface of the locating member of the air filter assembly.

12. The automobile air filtration system of claim 1, wherein the air filter assembly further comprises an end cap coupled to the first end of the filter media.

13. The automobile air filtration system of claim 1, further comprising:
   an inlet passageway defined by a second portion of the at least one sidewall, the inlet passageway extending to the inlet opening along an inlet axis;
   a second slip region defined in the second portion of the at least one sidewall defining the inlet passageway; and
   a second locating member coupled to the first end of the filter media,
   wherein, when the air filter assembly is received in the interior chamber of the air intake housing, the second locating member of the air filter assembly is received in the second slip region of the air intake housing.

14. The automobile air filtration system of claim 13, wherein the second locating member defines a plurality of notches defining a plurality of airflow passageways permitting air to flow in through the inlet opening and past the second locating member.

15. The automobile air filtration system of claim 13, wherein the air intake housing further comprises an outer rib projecting from the portion of the at least one sidewall into the outlet passageway, the outer rib located at a first end of the slip region.

16. The automobile air filtration system of claim 15, wherein the air intake housing further comprises an inner rib.

17. The automobile air filtration system of claim 16, wherein the inner rib projects from the portion of the at least one sidewall into the outlet passageway and is located at a second end of the slip region.

18. The automobile air filtration system of claim 16, wherein the inner rib projects from the second portion of the at least one sidewall into the inlet passageway and is located at an end of the second slip region.

* * * * *